(12) United States Patent
Taylor et al.

(10) Patent No.: US 8,021,762 B2
(45) Date of Patent: *Sep. 20, 2011

(54) COATED ARTICLES

(75) Inventors: Thomas Alan Taylor, Indianapolis, IN (US); Danny Lee Appleby, Indianapolis, IN (US); Albert Feuerstein, Carmel, IN (US); Ann Bolcavage, Indianapolis, IN (US); Neil Hitchman, Carmel, IN (US)

(73) Assignee: Praxair Technology, Inc., Danbury, CT (US)

( * ) Notice: Subject to any disclaimer, the term of this patent is extended or adjusted under 35 U.S.C. 154(b) by 288 days.

This patent is subject to a terminal disclaimer.

(21) Appl. No.: 11/796,261

(22) Filed: Apr. 27, 2007

(65) Prior Publication Data

US 2008/0213617 A1    Sep. 4, 2008

Related U.S. Application Data

(60) Provisional application No. 60/808,530, filed on May 26, 2006, provisional application No. 60/861,445, filed on Nov. 29, 2006.

(51) Int. Cl.
*B32B 15/04* (2006.01)
*B32B 15/20* (2006.01)
*B32B 18/00* (2006.01)
*F01D 5/14* (2006.01)

(52) U.S. Cl. ........ 428/633; 428/678; 428/680; 428/685; 428/332; 416/241 R; 65/374.13

(58) Field of Classification Search .......... 428/632, 428/633, 678, 679, 680, 681, 685, 220, 332
See application file for complete search history.

(56) References Cited

U.S. PATENT DOCUMENTS

| | | | |
|---|---|---|---|
| 4,377,371 A | 3/1983 | Wisander et al. | |
| 4,430,360 A | 2/1984 | Bill et al. | |
| 4,457,948 A | 7/1984 | Ruckle et al. | |
| 4,481,237 A | 11/1984 | Bosshart et al. | |
| 4,503,130 A | 3/1985 | Bosshart et al. | |
| 4,588,607 A | 5/1986 | Matarese et al. | |
| 4,822,689 A | 4/1989 | Fukubayashi et al. | |
| 4,884,820 A | 12/1989 | Jackson et al. | |
| 5,059,095 A | 10/1991 | Kushner et al. | |
| 5,073,433 A | 12/1991 | Taylor | |
| 5,372,845 A * | 12/1994 | Rangaswamy et al. | 427/216 |
| 5,455,119 A * | 10/1995 | Taylor et al. | 428/632 |

(Continued)

FOREIGN PATENT DOCUMENTS

EP    1550645 A2    7/2005

(Continued)

OTHER PUBLICATIONS

Machine Translation, SIV SOC IT VETRO, FR 2301482, Oct. 1976.*

(Continued)

*Primary Examiner* — Michael Lavilla
(74) *Attorney, Agent, or Firm* — Robert J. Hampsch

(57) ABSTRACT

This invention relates to articles coated with a thermally sprayed coating of a high purity yttria or ytterbia stabilized zirconia powder, said high purity yttria or ytterbia stabilized zirconia powder comprising from about 0 to about 0.15 weight percent impurity oxides, from about 0 to about 2 weight percent hafnium oxide (hafnia), from about 6 to about 25 weight percent yttrium oxide (yttria) or from about 10 to about 36 weight percent ytterbium oxide (ytterbia), and the balance zirconium oxide (zirconia). The articles include, for example, blades, vanes and seal surfaces of gas turbine engines coated with a thermal barrier coating.

23 Claims, 11 Drawing Sheets

U.S. PATENT DOCUMENTS

| | | | |
|---|---|---|---|
| 5,520,516 A | | 5/1996 | Taylor et al. |
| 5,630,314 A | * | 5/1997 | Kojima et al. .............. 60/39.182 |
| 5,743,013 A | | 4/1998 | Taylor et al. |
| 5,879,753 A | | 3/1999 | Zajchowski et al. |
| 5,993,976 A | | 11/1999 | Sahoo et al. |
| 6,102,656 A | * | 8/2000 | Nissley et al. .............. 415/174.4 |
| 6,117,560 A | * | 9/2000 | Maloney ....................... 428/472 |
| 6,180,262 B1 | | 1/2001 | Freling et al. |
| 6,190,124 B1 | | 2/2001 | Freling et al. |
| 6,284,691 B1 | * | 9/2001 | Bruce ........................... 501/103 |
| 6,432,487 B1 | | 8/2002 | Graham et al. |
| 6,808,799 B2 | * | 10/2004 | Darolia et al. ............. 428/305.5 |
| 6,869,550 B2 | | 3/2005 | Dorfman et al. ................... 264/5 |
| 2003/0118873 A1 | * | 6/2003 | Murphy ......................... 428/701 |
| 2006/0024527 A1 | * | 2/2006 | Schlichting et al. ........... 428/701 |
| 2007/0082131 A1 | * | 4/2007 | Doesburg et al. ......... 427/255.31 |

FOREIGN PATENT DOCUMENTS

| | | | |
|---|---|---|---|
| EP | | 1772441 A1 | 4/2007 |
| FR | | 2301482 | * 10/1976 |

OTHER PUBLICATIONS

VaBen et al., "Influence of Impurity Content and Porosity of Plasma-Sprayed Yttria-Stabilized Zirconia Layers on the Sintering Behaviour", Surface and Coatings Technology 141, 2001, pp. 135-140.

Taylor, et al., "Thermal Fatigue of Plasma Sprayed MgO.Zr02 and Zro2-6/6Y203 Thermal Barrier Coatings", 84th Annual Meeting American Ceramic Soc. Cincinnati, Ohio, May 4, 1982.

I.E. Sunmer,et al., "AIAA-80-1193 Dev of Improved-Durability Plasma Sprayed Ceramic Coatings for Gas Turbine Engines", AIAA/SAE/ASME 16th Joint Propulsion Conference Jun. 2, 1980.

G. Johner, et al., "Experimental and Theoretical Aspects of Thick Thermal Barrier Coatings . . . " Thermal Spray: Advances in Coatings Technology, Sep. 14-17, 1987.

Nakira, et al.,"Advanced Thermal Barrier Coatings Involving Efficient Vertical Micro-Cracks", Int'l Spray Conference & Exposition, Florida, USA, May 28-Jun. 5, 1992, 519-524.

* cited by examiner

COATED ARTICLES

RELATED APPLICATIONS

This application claims the benefit of U.S. Provisional Application Ser. No. 60/808,530, filed on May 26, 2006, and U.S. Provisional Application Ser. No. 60/861,445, filed on Nov. 29, 2006, both of which are incorporated herein by reference. This application is related to U.S. patent application Ser. No. 11/796,472, filed on an even date herewith; U.S. patent application Ser. No. 11/796,269, filed on an even date herewith; U.S. patent application Ser. No. 11/796,270, filed on an even date herewith; U.S. patent application Ser. No. 11/796,257, filed on an even date herewith; and U.S. patent application Ser. No. 11/796,271, filed on an even date herewith; all of which are incorporated herein by reference.

FIELD OF THE INVENTION

The invention relates to coated articles made from high purity yttria or ytterbia stabilized zirconia powders, said coated articles intended to be used in cyclic thermal environments such as for gas turbine blades, vanes and seal surfaces exposed in the hot section of gas turbine engines.

BACKGROUND OF THE INVENTION

Modern gas turbine engines operate in high temperature environment in excess of 2000° F. in which hot gases are expanded across rows of turbine blades. Outer air seal or shroud segments circumscribe the turbine blades to minimize leakage of the gases over the tips of the blades. The use of thermal barrier coatings on gas turbine blades and surfaces such as shroud segments have been found to have several advantages. Through the use of thermal barrier coatings higher operating efficiency can be obtained because less cooling air is required to maintain blade or shroud temperatures. In addition, component life is extended since the rate of change of metal temperature is reduced by the insulating effect of the thermal barrier.

Zirconia based thermal barrier coatings, because of their low thermal conductivity, are added to the surface of metal components to insulate them from the hot gas stream. Stabilized zirconia was developed and used as a thermal barrier coating for turbine and shroud components. Coatings such as CaO stabilized zirconia, MgO stabilized zirconia and yttria stabilized zirconia have been tested with yttria partially stabilized zirconia providing the best results.

U.S. Pat. No. 5,073,433 discloses a thermal barrier coating for substrates comprising zirconia partially stabilized by yttria and having a density of greater than 88% of the theoretical density with a plurality of vertical macrocracks homogeneously dispersed throughout the coating to improve its thermal fatigue resistance. This patent also discloses a process for producing the thermal barrier coating.

The continues to be a need in the art to provide improved thermal barrier coating for components intended to be used in cyclic thermal environments such as for gas turbine blades, vanes and seal surfaces exposed in the hot section of gas turbine engines.

SUMMARY OF THE INVENTION

This invention relates in part to articles coated with a thermally sprayed coating of a high purity yttria or ytterbia stabilized zirconia powder, said high purity yttria or ytterbia stabilized zirconia powder comprising from about 0 to about 0.15 weight percent impurity oxides, from about 0 to about 2 weight percent hafnium oxide (hafnia), from about 6 to about 25 weight percent yttrium oxide (yttria) or from about 10 to about 36 weight percent ytterbium oxide (ytterbia), and the balance zirconium oxide (zirconia).

This invention also relates in part to articles coated with a thermal barrier coating comprising zirconia partially stabilized by yttria or ytterbia, and having a density greater than 88% of the theoretical density with a plurality of vertical macrocracks substantially homogeneously dispersed throughout the coating in which a cross-sectional area of the coating normal to the article exposes a plurality of vertical macrocracks extending at least half the coating thickness in length up to the full thickness of the coating and having from about 5 to about 200 vertical macrocracks per linear inch measured in a line parallel to the surface of the article and in a plane perpendicular to the surface of the article, said thermal barrier coating comprising a thermally sprayed coating of a high purity yttria or ytterbia stabilized zirconia powder, said high purity yttria or ytterbia stabilized zirconia powder comprising from about 0 to about 0.15 weight percent impurity oxides, from about 0 to about 2 weight percent hafnium oxide (hafnia), from about 6 to about 25 weight percent yttrium oxide (yttria) or from about 10 to about 36 weight percent ytterbium oxide (ytterbia), and the balance zirconium oxide (zirconia).

DETAILED DESCRIPTION OF THE INVENTION

Figure 1:
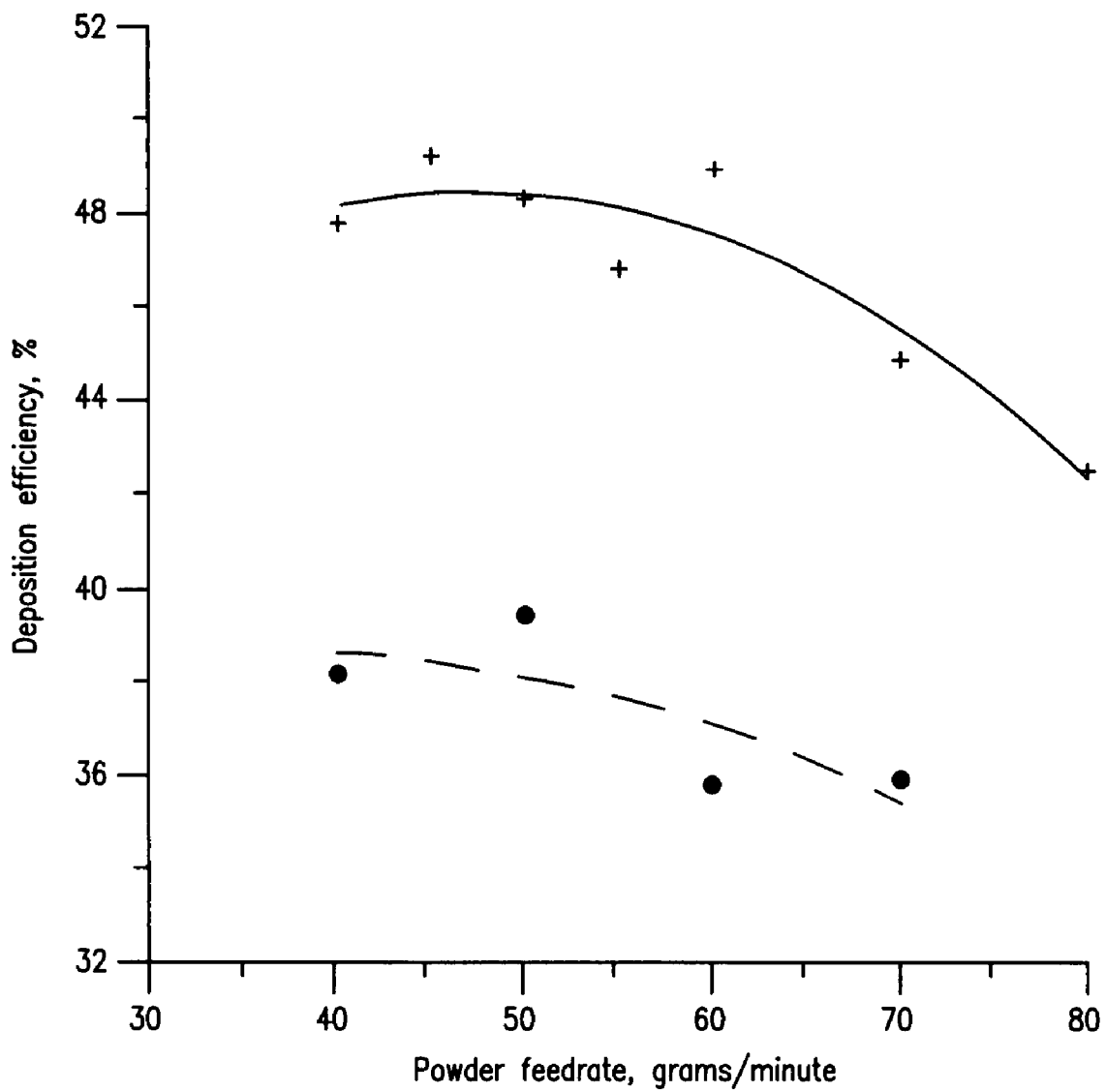
FIG. 1 graphically depicts the deposition efficiency of a new high purity yttria stabilized zirconia powder (i.e., Powder C or ZrO-300 is the unbroken line) and a conventional yttria stabilized zirconia powder (i.e., Powder D or ZrO-137 is the broken line) for coatings onto ⅜ inch square steel tabs in both cases.

A new morphology of yttria-stabilized zirconia powder has been discovered, which may also be applied to other zirconia-based powders with other stabilizers, separately or in addition to yttria or ytterbia. The new high purity yttria or ytterbia stabilized zirconia powders, combined with new plasma and detonation gun thermal spray conditions, have been found to have much higher deposition efficiency, density, standoff tolerance for coating, and are capable of forming desired segmentation cracking pattern for strain tolerance. In high temperature thermal shock testing, the new high purity yttria or ytterbia stabilized zirconia powders have been found to be superior to thermal barrier coatings of previous segmented yttria stabilized zirconia coatings.

As used herein, a splat shall mean a single molten powder particle impacted upon the surface of the substrate wherein it spreads out to form a thin platelet. Generally these platelets are from 5 to 100 microns in diameter and 1 to 5 microns thick, more generally about 2 microns thick.

As used herein, a vertical macrocrack is a crack in the coating if extended to contact the surface of the article will form an angle of from 30° to 0° with a line extended from said contact point normal to the surface of the article. Preferably, the vertical macrocracks will form an angle of 10° to 0° with the normal line. In addition to vertical macrocracks, one or more horizontal macrocracks may develop in the coating. Preferably, the coating should have no horizontal macrocracks. A horizontal macrocrack is a crack forming an angle of from 10° to 0° with a plane bisecting said crack and disposed parallel to the surface of the article. If present, the horizontal macrocracks preferably should not extend to contact more than one vertical macrocrack since to do so could weaken the coating and subject the coating to spalling. The length dimension of the vertical macrocrack and the length dimension of the horizontal macrocrack is the straight line distance from one end of the crack to the opposite end of the crack. The length of the horizontal macrocrack, if present, could be from about 5 to 25 percent of the coated cross section, counting only horizontal cracks that touch two or more vertical segmentation cracks.

The coatings described herein are thermal barrier coatings having low thermal conductivity due to the inherent nature of zirconia material. Porosity and interfaces within the coating can also add interruptions to heat flow and thus reduce the effective thermal conductivity. Yet, the coating is intentionally high density (low porosity) to have high erosion resistance and to facilitate segmentation crack formation by the process described herein. It is also typically meant to have low horizontal crack density, since this might be a factor in thermal shock life. However, the density of horizontal cracks can be minimized or maximized, and both structures may be useful. In the case where the thermal shock exposure is not too severe, it may be possible to intentionally increase the horizontal crack density and thus lower thermal conductivity. This is done during the coating process, where the plasma torch is used to cause interruptions in the normally well-bonded interface between torch passes.

The high purity yttria or ytterbia stabilized zirconia powders useful in this invention comprise from about 0 to about 0.15, preferably from about 0 to about 0.12, weight percent impurity oxides, from about 0 to about 2, preferably from about 0 to about 1.5, weight percent hafnium oxide (hafnia), from about 6 to about 25, preferably from about 6 to about 10, more preferably from about 6.5 to about 8, weight percent yttrium oxide (yttria) or from about 10 to about 36, preferably from about 10 to about 16, more preferably from about 11 to about 14, weight percent ytterbium oxide (ytterbia), and the balance zirconium oxide (zirconia). The impurity oxides comprise from about 0 to about 0.02, preferably from about 0 to about 0.01, weight percent silicon dioxide (silica), from about 0 to about 0.005, preferably from about 0 to about 0.002, weight percent aluminum oxide (alumina), from about 0 to about 0.01, preferably from about 0 to about 0.005, weight percent calcium oxide, from about 0 to about 0.01, preferably from about 0 to about 0.005, weight percent ferric oxide, from about 0 to about 0.005, preferably from about 0 to about 0.002, weight percent magnesium oxide, and from about 0 to about 0.01, preferably from about 0 to about 0.005, weight percent titanium dioxide.

The high purity yttria or ytterbia stabilized zirconia powders useful in this invention may comprise blends of two or more high purity yttria or ytterbia stabilized zirconia powders. For example, the high purity yttria or ytterbia stabilized zirconia powder useful in this invention can comprise from about 55 to about 95 volume percent of a first high purity yttria or ytterbia partially stabilized zirconia powder having from about 0 to about 0.15 weight percent impurity oxides, from about 0 to about 2 weight percent hafnium oxide (hafnia), from about 6 to about 10, preferably from about 6 to about 8, weight percent yttrium oxide (yttria) or from about 10 to about 14, preferably from about 10 to about 12, weight percent ytterbium oxide (ytterbia), and the balance zirconium oxide (zirconia), and from about 5 to about 45 volume percent of a second high purity yttria or ytterbia fully stabilized zirconia powder having from about 0 to about 0.15 weight percent impurity oxides, from about 0 to about 2 weight percent hafnium oxide (hafnia), from about 16 to about 22 weight percent yttrium oxide (yttria) or from about 25 to about 33 weight percent ytterbium oxide (ytterbia), and the balance zirconium oxide (zirconia).

The high purity yttria or ytterbia stabilized zirconia powder blends can comprise a blend of two or more high purity yttria or ytterbia stabilized zirconia powders that reduce the thermal conductivity of a composite coating made therefrom, and maintain the thermal shock resistance of a 6 to 10, preferably 6 to 8, weight percent yttria partially stabilized zirconia coating. In an embodiment, the blends comprise from about 20 to about 45 volume percent of a second high purity yttria or ytterbia fully stabilized zirconia powder, and from about 55 to about 80 volume percent of a first high purity yttria or ytterbia partially stabilized zirconia powder.

Coatings with 6.5 to 8 weight percent yttria added to zirconia provide desired thermal shock resistance, due to speculated toughening mechanisms at the leading edge of a growing crack, having to do with tetragonal to monoclinic phase transformation under stress. Yet, 20 weight percent yttria-stabilized zirconia, called fully stabilized because it is in the cubic structure and does not undergo phase transformation, has lower thermal conductivity. Usually, the property of thermal shock resistance is more important than lower thermal conductivity, so the industry favors 7 weight percent yttria-stabilized zirconia.

If the low yttria stabilized material is made the continuous phase in the coating, with the high yttria stabilized material being isolated within that matrix, it should be possible to benefit from the lower conductivity of the high yttria stabilized material, since heat flow averages all the material and interfaces and pores in the coating as it moves through. If the high yttria particles have cracks develop during thermal shock exposure, they should just affect that phase and stop at the low yttria surrounding matrix.

This is accomplished by blending the two separate powders in the desired ratio and thermally spraying to form the composite coating. The low yttria powder should be the major component, so that it would be the continuous phase or the matrix of the coating. The amount of lowered thermal conductivity would increase with more of the high yttria zirconia, so a balance should be found for the application involved. If the thermal shock conditions are not too severe, more high yttria component could be added.

Composite high purity yttria or ytterbia stabilized zirconia powders for improving abrasive properties are also useful in this invention. When including a second component more abrasive than the zirconia, then preferably the second component should be sized at least 2 mils in any dimension up to 95% of the coating thickness. In this embodiment in which at least two powders are used, it is preferable to have the fine zirconia particles adhere to the surface of the larger abrasive particles. Suitable abrasive particles would be alumina, chromia, or alloys thereof added to the total powder composition in an amount of 10 to 40 weight percent of the total powder, preferably 20 to 30 weight percent of the total powder composition.

Composite high purity yttria or ytterbia stabilized zirconia powders for lowering thermal conductivity are also useful in this invention. Illustrative composite powders include composite high purity yttria or ytterbia stabilized zirconia powder comprising a high purity yttria or ytterbia stabilized zirconia powder having from about 0 to about 0.15 weight percent impurity oxides, from about 0 to about 2 weight percent hafnium oxide (hafnia), from about 6 to about 25 weight percent yttrium oxide (yttria) or from about 10 to about 36 weight percent ytterbium oxide (ytterbia), and the balance zirconium oxide (zirconia), said powder having a nominal average size of 20-60 microns with surface-adhered gadolinia particles having a nominal average size of 0.5 to 2 microns.

Composite high purity yttria or ytterbia stabilized zirconia powders for lowering thermal conductivity offer a simple and cost-effective way of adding additional thermal conductivity-modifying components to the powder. Typically, the powder can be made by one of the methods described herein, such as the fuse and crush method. The additional component, e.g., gadolinia, can be added in the desired amount to the melt mixture. This operation is typically done in large batches, e.g., 1000 pounds or more. If the addition is slightly off from the desired amount, the whole batch can end up as useless scrap, a great expense.

Further, the fused mass can be crushed to fine powder then sized. Usually large losses occur in this operation with the over-size and under-size particles being scrapped. In the embodiment, the basic simple material would be made as usual, such as 7 weight percent yttria-stabilized zirconia, and sized to the desired range. Over and under-size of this material could be used again in the next melt batch. Then the correct size basic powder, which is typically about 20 to 60 microns in average size, is blended with ultra-fine gadolinia particles with a binder added, such as dilute white glue. The powder is dried and lightly tumbled to separate any large particles sticking together. The fine gadolinia adheres to the surface of the basic large particles in about the desired amount.

One may calculate how much fine gadolinia, or any such additive, must be added to the mixture to obtain a desired composite. This is done by measuring the mean particle volume of the large basic particle using the Microtrac™ particle size analyzer. The same is done for the ultra-fine additive particle. The fine size of the add-on is important so that it can be uniformly adhered to the large particle at the percentage desired. Sizes of about 0.5 to 2 microns for the fine and about 60 microns for the large basic particle are about right. Each case would be so calculated to find the right match for the additive level desired. The composite particle can then be sprayed with any thermal spray device, which as it melts the particles, alloys the whole composition together. This method allows small batches to be made as well as large, and any composite composition can be obtained by adding more or less of the ultra-fine component to a given mass of large basic composition particles.

The average particle size of the thermal spraying powders useful in this invention is preferably set according to the type of thermal spray device and thermal spraying conditions used during thermal spraying. The average particle size can range from about 1 to about 150 microns, preferably from about 5 to about 50 microns, and more preferably from about 10 to about 45 microns.

High purity yttria or ytterbia stabilized zirconia powders are provided that are capable of achieving thermal sprayed coatings having a density greater than 88% of the theoretical density with a plurality of vertical macrocracks substantially homogeneously dispersed throughout the coating in which a cross-sectional area of the coating normal to the article exposes a plurality of vertical macrocracks extending at least half the coating thickness in length up to the full thickness of the coating and having from about 5 to about 200, preferably from about 20 to about 200, more preferably from about 40 to about 100, vertical macrocracks per linear inch measured in a line parallel to the surface of the article and in a plane perpendicular to the surface of the article.

The thermal spraying powders useful in this invention can be produced by conventional methods such as agglomeration (spray dry and sinter or sinter and crush methods) or cast and crush. In a spray dry and sinter method, a slurry is first prepared by mixing a plurality of raw material powders and a suitable dispersion medium. This slurry is then granulated by spray drying, and a coherent powder particle is then formed by sintering the granulated powder. The thermal spraying powder is then obtained by sieving and classifying (if agglomerates are too large, they can be reduced in size by crushing). The sintering temperature during sintering of the granulated powder is preferably 1000 to 1300° C.

The thermal spraying powders useful in this invention may be produced by another agglomeration technique, sinter and crush method. In the sinter and crush method, a compact is first formed by mixing a plurality of raw material powders followed by compression and then sintered at a temperature between 1200 to 1400° C. The thermal spraying powder is then obtained by crushing and classifying the resulting sintered compact into the appropriate particle size distribution.

The thermal spraying powders useful in this invention may also be produced by a cast (melt) and crush method instead of agglomeration. In the melt and crush method, an ingot is first formed by mixing a plurality of raw material powders followed by rapid heating, casting and then cooling. The thermal spraying powder is then obtained by crushing and classifying the resulting ingot.

In general, the thermal spraying powders can be produced by conventional processes such as the following:

Spray Dry and Sinter method—the raw material powders are mixed into a slurry and then spray granulated. The agglomerated powder is then sintered at a high temperature (at least 1000° C.) and sieved to a suitable particle size distribution for spraying;

Sinter and Crush method—the raw material powders are sintered at a high temperature in a hydrogen gas or inert atmosphere (having a low partial pressure of oxygen) and then mechanically crushed and sieved to a suitable particle size distribution for spraying; Cast and Crush method—the raw material powders are fused in a crucible and then the resulting casting is mechanically crushed and sieved; and Densification method—the powder produced in any one of above process (i)-(iii) is heated by plasma flame or laser and sieved (plasma-densifying or laser-densifying process).

The average particle size for the spray dry method of each raw material powder is preferably no less than 0.1 microns and more preferably no less than 0.2 microns, but preferably no more than 10 microns. If the average particle size of a raw material powder is too small, costs may increase. If the average particle size of a raw material powder is too large, it may become difficult to uniformly disperse the raw material powder.

The individual particles that compose the thermal spraying powder preferably have enough mechanical strength to stay coherent during the thermal spraying process. If the mechanical strength is too small, the powder particle may break apart clogging the nozzle or accumulate on the inside walls of the thermal spray device.

The coating process involves flowing powder through a thermal spraying device that heats and accelerates the powder onto a substrate. Upon impact, the heated particle deforms resulting in a thermal sprayed lamella or splat. Overlapping splats make up the coating structure. A detonation process useful in this invention is disclosed in U.S. Pat. No. 2,714,563, the disclosure of which is incorporated herein by reference. The detonation process is further disclosed in U.S. Pat. Nos. 4,519,840 and 4,626,476, the disclosures of which are incorporated herein by reference. U.S. Pat. No. 6,503,290, the disclosure of which is incorporated herein by reference, discloses a high velocity oxygen fuel process useful in this invention.

Thermally sprayed coatings, e.g., thermal barrier coatings, can be made from a high purity yttria or ytterbia stabilized zirconia powder, said high purity yttria or ytterbia stabilized zirconia powder comprising from about 0 to about 0.15 weight percent impurity oxides, from about 0 to about 2 weight percent hafnium oxide (hafnia), from about 6 to about 25 weight percent yttrium oxide (yttria) or from about 10 to about 36 weight percent ytterbium oxide (ytterbia), and the balance zirconium oxide (zirconia). The high purity yttria or ytterbia stabilized zirconia powders useful in the thermally sprayed coatings are described above.

The thermally sprayed coatings, e.g., thermal barrier coatings, typically have a density greater than 88% of the theoretical density with a plurality of vertical macrocracks substantially homogeneously dispersed throughout the coating in which a cross-sectional area of the coating normal to the article exposes a plurality of vertical macrocracks extending at least half the coating thickness in length up to the full thickness of the coating, preferably a density from 90% to 98% of the theoretical density and wherein a plurality of said vertical macrocracks extend at least half the coating thickness in length up to the full thickness of the coating and having from about 5 to about 200 vertical macrocracks per linear inch, preferably having from about 20 to about 100 vertical macrocracks per linear inch, and more preferably having from about 40 to about 60 vertical macrocracks per linear inch, measured in a line parallel to the surface of the article and in a plane perpendicular to the surface of the article. The width of the vertical macrocracks is typically less than about 1 mil. In an embodiment, the thermally sprayed coatings can have vertical segmentation cracks that are arranged as cells in a three-dimensional coating perspective, having a mean cell width of 0.02 inches, and a range of from about 0.005 to about 0.2 inches.

The thermally sprayed coatings, e.g., thermal barrier coatings, may contain one or more horizontal macrocracks extending within the coating parallel to the surface of the article. Preferably, the horizontal macrocracks do not contact more than one vertical macrocrack. The thermally sprayed coatings may contain horizontal crack segments, connecting any two vertical segmentation cracks, measured in the polished cross section, having a total sum length of less than 10% of the coating width.

In an embodiment, a bond coating may be deposited between the article and the thermally sprayed coating, e.g., thermal barrier coating. The bond coating typically comprises an alloy containing chromium, aluminum, yttrium with a metal selected from the group consisting of nickel, cobalt and iron. Preferably, the bond coat comprises a MCrAlY+X coating applied by plasma spray methods or by detonation spray methods or by electroplating methods, where M is Ni, Co or Fe or any combination of the three elements, and X includes the addition of Pt, Ta, Hf, Re or other rare earth metals, or fine alumina dispersant particles, singularly or in combination.

The thermally sprayed coatings, e.g., thermal barrier coatings, exhibit several desired properties including the following: an enhanced sintering resistance such that at 1200° C., density increases by less than 0.5% in 4 hours; a modulus in the plane of the coating of less than 0.6 MPa, and a coating cohesive strength in the direction of the coating thickness of greater than 40 MPa; after exposure at 1200° C. for 4 hours, a modulus in the plane of the coating of less than 0.9 MPa, and a coating cohesive strength in the direction of the coating thickness of greater than 45 MPa; a thermal conductivity in a direction through the thickness of the coating that is less than 0.014 watt/centimeter at 25° C. and less than 0.0135 watt/centimeter at 500° C.; after exposure at 1200° C. for 4 hours, a thermal conductivity in a direction through the thickness of the coating that is less than 0.015 watt/centimeter at 25° C. and less than 0.014 watt/centimeter at 500° C.; a particle erosion rate to 50 micron angular alumina at 20 degrees impingement and 200 feet/second velocity of less than 1 milligram per gram of erodent at 25° C.; after exposure at 1200° C. for 4 hours, a particle erosion rate to 50 micron angular alumina at 20 degrees impingement and 200 feet/second velocity of less than 0.5 milligrams per gram of erodent at 25° C.; less than 3 percent monoclinic phase by x-ray diffraction methods; and after exposure at 1200° C. for 4 hours, less than 3 percent monoclinic phase by x-ray diffraction methods.

The thermally sprayed coatings can be further stabilized by heat treatment in vacuum or air at a temperature of 1000° C. or greater. As detailed in Example 7 below, the threshold of CPI for having excellent thermal shock life was lowered from 20 CPI for conventional ZrO-137 powder coatings to about 5 CPI for new high purity Zro-300 powder coatings. An embodiment is to coat the high purity ZrO-300 powder coatings to a safe CPI structure and then heat treat the coated article.

Thermal barrier coatings can be useful for protecting articles such as blades, vanes and seal surfaces of gas turbine engines, said coating comprising zirconia partially stabilized by yttria, having a density greater than 88% of the theoretical density, and having a plurality of vertical macrocracks substantially homogeneously dispersed throughout the coating in which a cross-section area of the coating normal to the surface of article exposes a plurality of vertical macrocracks extending at least half the coating thickness, preferably at least two-thirds the coating thickness, in length up to the full thickness of the coating and having from about 5 to about 200, preferably from about 20 to about 200, vertical macrocracks, more preferably from about 40 to about 100 vertical macrocracks, per linear inch measured in a line parallel to the surface of the article and in a plane perpendicular to the surface of the article. The length of a plurality of the vertical macrocracks should extend at least half the coating thickness in length up to the full thickness of the coating so that they pass through at least 50 splats of the deposited powder.

For most applications, the density of the coating preferably should be between 90% and 98% of the theoretical density and most preferably about 92 percent of the theoretical density. The vertical macrocracks are formed in the coating by plasma depositing powders of the coating onto the surface of the article in discrete monolayers in which the thickness of each monolayer contains at least two superimposed splats of the deposited powder (about 0.16 mils) and preferably from about three to five splats of the deposited powder (from about 0.24 mils and 0.40 mils, respectively).

Although not bound by theory, it is believed that the deposit of two or more superimposed splats of the powder will result in the second and subsequent splats being deposited at higher temperatures than the preceding splats. This is due to the fact that the first splat of the powder is deposited on a relatively colder article while the second and subsequent splats are deposited on preceding splats that are progressively hotter. Thus the overall deposit of two or more splats results in a temperature gradient with the higher temperature at the top surface. Upon cooling and solidification of the monolayer deposit, the second and subsequent splats shrink more than the preceding splats and form vertical microcracks through the deposited layer.

Additional monolayers are superimposed on the article with each monolayer forming vertical macrocracks which have a tendency to align with the previously formed macrocracks in the preceding monolayers. This effectively produces some macrocracks that extend substantially through the thickness of the coating. The width of the vertical macrocracks, i.e., the distance between opposing faces defining the vertical macrocracks, is generally less than about 1 mil, preferably less than ½ mil.

If the density of coating is less than 88% of the theoretical density, the stress caused by the shrinkage of splats in the monolayer may be absorbed or compensated by the porosity of the coating. This will effectively prevent the formation of macrocracks throughout the coating and prevent producing a coating with good thermal fatigue resistance. The substantial homogeneous distribution of vertical macrocracks throughout the coating will reduce the modulus of elasticity of the coating structure thereby reducing the local stresses. This results in excellent thermal fatigue resistance for the coating that enables it to function without failure in cyclic thermal environments.

The density of the vertical macrocracks should be preferably 20 or more, most preferably 40 or more, vertical macrocracks per linear inch taken in a cross-section plane of the coating along a line parallel to the surface of the article. This will insure that sufficient vertical macrocracks are present in the coating to provide good thermal fatigue resistance. To obtain the necessary vertical macrocracks in this coating, the plasma apparatus should be of high efficiency and stable over the period of depositing the coating. The spray torch should be positioned at a fixed distance from the surface of the article and the relative speed between the torch and the article should be controlled to insure that the monolayer instantly put down by one sweep of the torch will be sufficient to produce overlap of the deposited splats of powder in which the second and subsequent deposited splats are hotter than the preceding deposited splats for the reason discussed above.

The overall thickness of the coating can vary depending on the end use application. For components of gas turbine engines, the coating thickness can vary from 0.0025 to 0.10 inch. The preferred zirconia partially stabilized by yttria would be 6 to 8 weight percent yttria with the balance zirconia and most preferably about 7 weight percent yttria with the balance substantially zirconia. The thermal barrier coating is ideally suited as a top coat for a metallic bond coated article such as blades, vanes and seals of gas turbine engines. The preferred metallic bond coating would comprise (i) an alloy containing chromium, aluminum, yttrium with a metal selected from the group consisting of nickel, cobalt and iron or (ii) an alloy containing aluminum and nickel. This bond coating can be deposited using conventional plasma spray techniques or any other conventional technique. The article could be any suitable material such as a nickel-base, cobalt-base or iron-base alloy.

The thermal barrier coatings can be further stabilized by heat treatment in vacuum or air at a temperature of 1000° C. or greater. As detailed in Example 7 below, the threshold of CPI for having excellent thermal shock life was lowered from 20 CPI for conventional ZrO-137 powder coatings to about 5 CPI for new high purity Zro-300 powder coatings. An embodiment is to coat the high purity ZrO-300 powder coatings to a safe CPI structure and then heat treat the coated article.

The thermal barrier coatings are highly thermal shock resistant and are capable of long life in high temperature, temperature cyclic applications, such as aircraft engine components, industrial gas turbine components, and steel and glass annealing line support rolls, among others. Typically, the thermal barrier coatings are high density as coated (e.g., about 88 percent or greater of the theoretical density), in the tetragonal crystallographic form with no monoclinic phase, and have about 5 to about 200 vertical segmentation cracks running through the thickness of the coating. The thermal barrier coatings exhibit thermal shock resistance even when coated to thicknesses of 2 millimeters or more.

A process for producing a thermal barrier coating comprises:

a) thermally depositing a high purity yttria or ytterbia stabilized zirconia powder, said powder comprising from about 0 to about 0.15 weight percent impurity oxides, from about 0 to about 2 weight percent hafnium oxide (hafnia), from about 6 to about 25 weight percent yttrium oxide (yttria) or from about 10 to about 36 weight percent ytterbium oxide (ytterbia), and the balance zirconium oxide (zirconia), onto the surface of an article to form a monolayer having at least two superimposed splats of the deposited powders on the article in which the temperature of a subsequent deposited splat is higher than the temperature of a previously deposited splat;

b) cooling and solidifying said monolayer of step a) whereupon said monolayer has a density of at least 88% of the theoretical density and wherein a plurality of vertical cracks are produced in the monolayer due to shrinkage of the deposited splats;

c) repeating steps a) and b) at least once to produce an overall coated layer in which each monolayer has induced vertical cracks through the splats and wherein a plurality of the vertical cracks in each monolayer are aligned with vertical cracks in an adjacent monolayer to form vertical macrocracks having a length of at least half the coating thickness in length up to the full thickness of the coating and said coated layer having at least 5, preferably at least 20, vertical macrocracks per linear inch measured in a line parallel to the surface of the article and in a plane perpendicular to the surface of the article.

Other thermal spray processes comprise thermally depositing a high purity yttria or ytterbia stabilized zirconia powder, said powder comprising from about 0 to about 0.15 weight percent impurity oxides, from about 0 to about 2 weight percent hafnium oxide (hafnia), from about 6 to about 25 weight percent yttrium oxide (yttria) or from about 10 to about 36 weight percent ytterbium oxide (ytterbia), and the balance zirconium oxide (zirconia), onto an article to produce a coating having vertical segmentation cracks, essentially through the full thickness of the coating, and having from about 5 to about 200 cracks per linear inch measured in a line parallel to the plane of the coating, and having horizontal cracking structure sufficient to reduce thermal conductivity to less than 0.012 watt/centimeter at 25° C. through the thickness of the coating.

In the thermal spray processes, the horizontal cracks can be controlled and used to reduce thermal conductivity through the coated layer. The horizontal crack structure of the thermal spray coatings is uniformly dispersed through the thickness of the coating, and amounts to at least 25% of the coating width, as measured by the sum of horizontal crack segments along any line parallel to the coating plane in the polished cross section, and such structure is stabilized by optionally heat treatment in vacuum or air at a temperature of 1000° C. or greater.

The thermal spray processes comprise thermally depositing a high purity yttria or ytterbia stabilized zirconia powder, said powder comprising from about 0 to about 0.15 weight percent impurity oxides, from about 0 to about 2 weight percent hafnium oxide (hafnia), from about 6 to about 25 weight percent yttrium oxide (yttria) or from about 10 to about 36 weight percent ytterbium oxide (ytterbia), and the balance zirconium oxide (zirconia), onto an article to produce a coating having vertical segmentation cracks essentially through the full thickness of the coating, and having from about 5 to about 200 cracks per linear inch measured in a line parallel to the plane of the coating, and having a thickness of from about 5 to about 200 mils; and having a final surface layer produced from said high purity yttria or ytterbia stabilized zirconia powder having a thickness up to about 5 mils and having essentially zero vertical crack segmentation.

The thermal spray processes comprise thermally depositing a high purity yttria or ytterbia stabilized zirconia powder, said powder comprising from about 0 to about 0.15 weight percent impurity oxides, from about 0 to about 2 weight percent hafnium oxide (hafnia), from about 6 to about 25 weight percent yttrium oxide (yttria) or from about 10 to about 36 weight percent ytterbium oxide (ytterbia), and the balance zirconium oxide (zirconia), onto an article to produce a coating having vertical segmentation cracks, essentially through the full thickness of the coating, and having from about 5 to 200 cracks per linear inch measured in a line parallel to the plane of the coating, and having a thickness of from about 5 to about 200 mils; and having a final surface layer comprising a dipped or solution-sprayed ceramic frit coating having a thickness up to about 5 mils; and treating said surface layer with a high temperature air heat treatment to bond and adhere the surface layer.

In the thermal spray process above, the frit layer is applied by non-thermal spray or by thermal spray of blended oxide powders comprising silica, alumina and the oxides of nickel, chromium, magnesium, copper, calcium and iron.

The processes may be conducted with a plasma torch using argon-hydrogen or nitrogen-hydrogen process gases, or with a detonation gun or apparatus using oxygen-acetylene or oxygen-acetylene-propylene process gases.

This invention relates to articles coated with a thermally sprayed coating of a high purity yttria or ytterbia stabilized zirconia powder, said high purity yttria or ytterbia stabilized zirconia powder comprising from about 0 to about 0.15 weight percent impurity oxides, from about 0 to about 2 weight percent hafnium oxide (hafnia), from about 6 to about 25 weight percent yttrium oxide (yttria) or from about 10 to about 36 weight percent ytterbium oxide (ytterbia), and the balance zirconium oxide (zirconia).

This invention relates to articles coated with a thermal barrier coating comprising zirconia partially stabilized by yttria or ytterbia, and having a density greater than 88% of the theoretical density with a plurality of vertical macrocracks substantially homogeneously dispersed throughout the coating in which a cross-sectional area of the coating normal to the article exposes a plurality of vertical macrocracks extending at least half the coating thickness in length up to the full thickness of the coating and having from about 5 to about 200, preferably from about 20 to about 200, more preferably from about 40 to about 100, vertical macrocracks per linear inch measured in a line parallel to the surface of the article and in a plane perpendicular to the surface of the article, said thermal barrier coating comprising a thermally sprayed coating of a high purity yttria or ytterbia stabilized zirconia powder, said high purity yttria or ytterbia stabilized zirconia powder comprising from about 0 to about 0.15 weight percent impurity oxides, from about 0 to about 2 weight percent hafnium oxide (hafnia), from about 6 to about 25 weight percent yttrium oxide (yttria) or from about 10 to about 36 weight percent ytterbium oxide (ytterbia), and the balance zirconium oxide zirconia).

For the articles of this invention, the thermal barrier coating coated thereon can be further stabilized by heat treatment in vacuum or air at a temperature of 1000° C. or greater. As detailed in Example 7 below, the threshold of CPI for having excellent thermal shock life was lowered from 20 CPI for conventional ZrO-137 powder coatings to about 5 CPI for new high purity Zro-300 powder coatings. An embodiment is to coat the high purity ZrO-300 powder coatings to a safe CPI structure and then heat treat the coated article.

Illustrative articles that may be coated in accordance with this invention include, for example, turbine blades or vanes of nickel or cobalt-base alloy, coated first with a metallic bond coat and then with a layer of said thermal barrier coating, having a thermal barrier coating thickness of about 5 to about 25 mils, and a vertical crack segmentation pattern of about 5 to about 200 cracks per linear inch measured in the polished cross section in a direction parallel to the plane of the coating, counting those cracks that are at least half the coating thickness in length.

Other articles include turbine combustion chambers of nickel or cobalt-base alloy, coated first with a metallic bond coat and then with a layer of said thermal barrier coating, having a thermal barrier coating thickness of about 5 to about 200 mils, and a vertical crack segmentation pattern of about 5 to about 200 cracks per linear inch measured in the polished cross section in a direction parallel to the plane of the coating, counting those cracks that are at least half the coating thickness in length.

Other articles include turbine air seal segment or ring of nickel or cobalt-base alloy, coated first with a metallic bond coat and then with a layer of said thermal barrier coating, having a thermal barrier coating thickness of about 5 to about 150 mils, and a vertical crack segmentation pattern of from about 5 to about 200 cracks per linear inch measured in the polished cross section in a direction parallel to the plane of the coating, counting those cracks that are at least half the coating thickness in length.

Other articles include turbine or compressor blades of nickel or cobalt-base alloy, coated first with a metallic bond coat and then with a layer of said thermal barrier coating, having a thermal barrier coating thickness of about 5 to about 45 mils, and a vertical crack segmentation pattern of from about 5 to about 200 cracks per linear inch measured in the polished cross section in a direction parallel to the plane of the coating, counting those cracks that are at least half the coating thickness in length.

Other articles include cylinder or transport rolls for steel or glass annealing lines, coated first with a metallic bond coat and then with a layer of said thermal barrier coating, having a thermal barrier coating thickness of about 5 to about 45 mils, and a vertical crack segmentation pattern of about 5 to about 200 cracks per linear inch measured in the polished cross section in a direction parallel to the plane of the coating, counting those cracks that are at least half the coating thickness in length.

While the preferred embodiments of this invention have been described, it will be appreciated that various modifications may be made to the high purity yttria or ytterbia stabilized zirconia powders, coatings made from the high purity yttria or ytterbia stabilized zirconia powders, and processes for producing the coatings for articles intended to operate in cyclic thermal environments without departing from the spirit or scope of the invention.

EXAMPLE 1

Table A below shows the composition of a conventional yttria stabilized zirconia powder (i.e., Powder B) and a high purity yttria stabilized zirconia powder (i.e., Powder A). The composition range for the conventional fused and crushed powder was taken from its specifications for maximum allowed values, with actual lot analyses typically about 10-50 percent of the maximum. The new high purity powder compositions were taken from five actual lots, giving only the maximum value analyzed for any lot. Of the components of yttria stabilized zirconia, yttria is meant to be in the range of 6.5 to 8 weight percent, in order to stabilize the structure in the tetragonal phase. The purpose of hafnia is unknown, but typically is always present at about 1.5 weight percent. Table A shows that Powder A is significantly more pure than Powder B in the un-wanted impurities of alumina, silica, iron oxide, titania and magnesia.

TABLE A

Powder Compositions (Weight percent)

| | Powder B | Powder A |
| --- | --- | --- |
| Zirconia | Balance | Balance |
| Yttria | 6.5-8 | 6.5-8 |
| Hafnia | 2.5 | 2.0 |
| Alumina | 0.7 | 0.001 |
| Silica | 1.5 | 0.011 |
| Iron oxide | 0.5 | 0.004 |
| Titania | 0.5 | 0.009 |
| Magnesia | 0.3 | 0.002 |

The powder morphology/structure is an important characteristic of the high purity yttria stabilized zirconia powders. The true powder density was determined by stereopycnometry. In this method, the volume of a container was determined accurately by measuring the gas volume filling it, a known mass of powder was added and the volume of the container with powder was determined. From this, the volume of the powder was known, and dividing the powder sample mass by that volume gives its true density. Table B gives true density results for a Powder B and Powder A.

TABLE B

True Density of Powders

| Powder B | Powder A | |
| --- | --- | --- |
| 5.92 | 6.00 | Grams/cubic centimeter |
| 98 | 99 | Percent of theoretical density |

In Table B, the theoretical density was calculated for the specific yttria composition of the powder. The theoretical density was 6.05 grams per cubic centimeter. Both Powder A and Powder B are very close to theoretical density indicating little internal porosity. Powder A is as dense as Powder B, but polished sections reveal a small pore in the center of many particles, and with thick dense walls of the particles.

Also, Powder A has a new and finer size range compared to Powder B. A definitive measurement method for powder size is the Microtrac™ particle size analyzer method, which uses a laser to detect the mean diameter of individual particles in a fluid streaming by the detector. This tabulation of laser results for many thousands or millions of particle gives a better measure of the size distribution than screens, and on a much finer level of separation between sizes. Using this method, Powder B was measured to find it is in the 34 to 38 micron range for the average particle. Using this method, Powder A was measured and found to be in the 26 to 34 microns range for average particle size. This particle size range may enable better melting of the powder in the thermal spray device.

The high purity, morphology/structure and finer size of Powder A are believed to be responsible for its improved properties obtained in thermal spraying as described below.

EXAMPLE 2

This example was conducted with a Praxair model 1108 plasma torch, although parameters could be found for making the desired coating with other torches, such as with the Praxair detonation gun or Praxair super detonation gun, the latter being of even higher particle velocity and temperature. In the Praxair model 1108 plasma torch, the plasma is developed in a flow of argon plus hydrogen gas by an electrical arc discharged between an electrode and an anode. The powder is carried in another argon stream and injected upstream of the arc, benefiting from a full transit though the arc zone. These flows and electrical currents can be varied to determine their effects on coating deposition rates.

Table C shows the powders used in this coating deposition. Powder C is significantly more pure than Powder D in the unwanted impurities of alumina, silica, iron oxide, titania, calcia, magnesia and other oxides.

TABLE C

| Powder Compositions (Weight percent) | | |
|---|---|---|
| | Powder D | Powder C |
| Zirconia | Balance | Balance |
| Yttria | 6.93 | 7.41 |
| Hafnia | 1.5 | 1.6 |
| Alumina | 0.2 | 0.001 |
| Silica | 0.1 | 0.008 |
| Iron oxide | 0.1 | 0.003 |
| Titania | 0.2 | 0.005 |
| Magnesia | 0.2 | 0.002 |
| Calcia | 0.1 | 0.003 |
| All other oxides | 0.3 | 0.1 |

For the Powder C and Powder D coating depositions, a total gas flow of 220 cubic feet per hour (which consists of 90 cubic feet per hour of argon torch gas, 90 cubic feet per hour of powder carrier gas (argon), and 40 cubic feet per hour of hydrogen auxiliary gas), 500 cubic feet per hour of a coaxial shield gas (argon), and an arc current of 170 amps (which obtains about 80 volts for about 13.6 KW) were used. Powder D and Powder C were compared using these same original conditions. FIG. 1 shows the deposition efficiency of the two powders for coating at 1 inch standoff onto ⅜-inch square steel tabs in both cases. Powder C (unbroken line in FIG. 1) is remarkably more efficient than Powder D (broken line in FIG. 1). Part of this improvement comes from the slightly finer size of Powder C, but part is likely due to the morphology/structure of Powder C.

Figure 2:
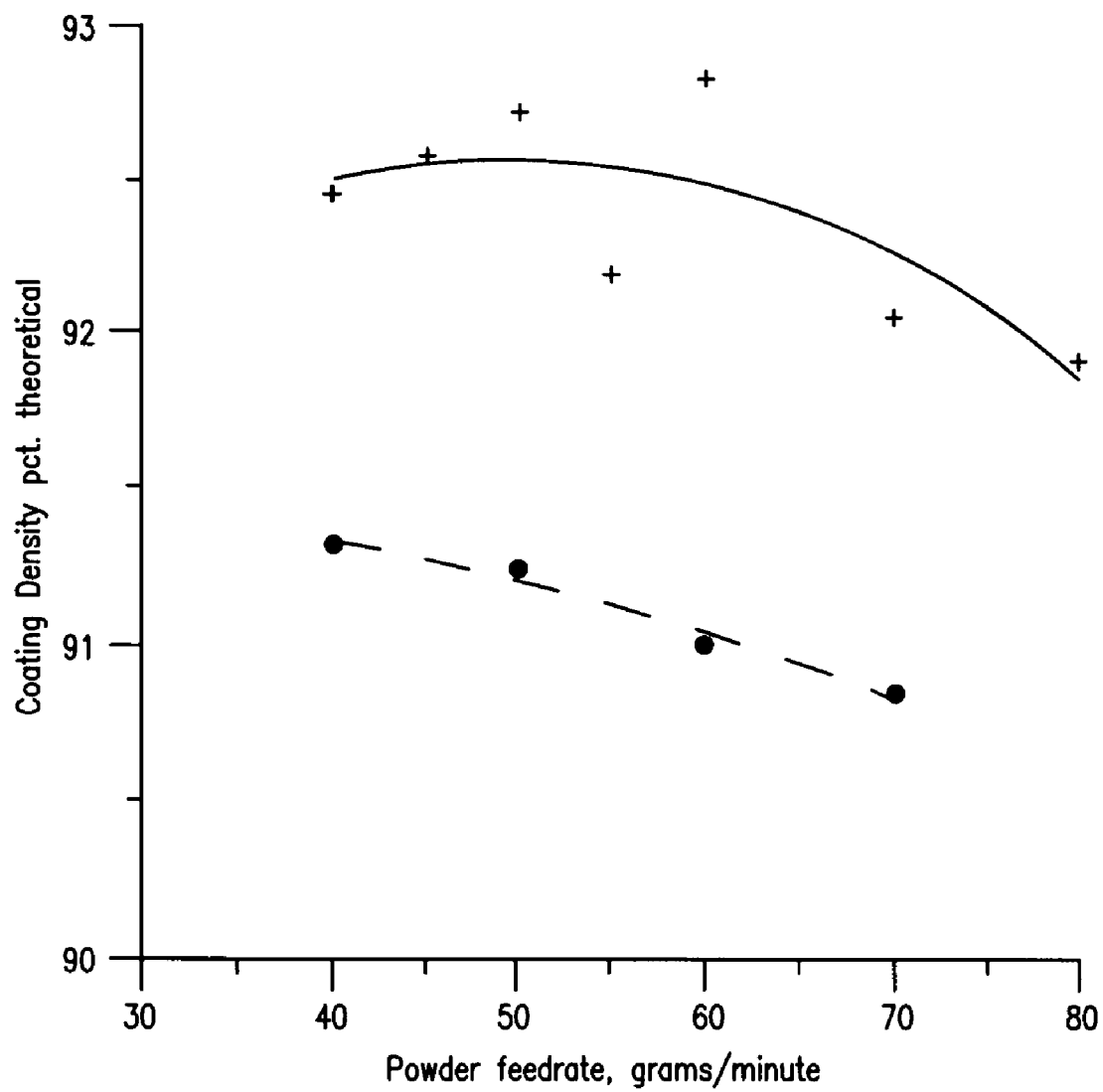
FIG. 2 graphically depicts the measured density of coatings produced at 1 inch standoff from torch to substrate onto ⅜ inch square steel tabs for a new high purity yttria stabilized zirconia powder (i.e., Powder C or ZrO-300 is the unbroken line) and for a conventional yttria stabilized zirconia powder (i.e., Powder D or ZrO-137 is the broken line).

FIG. 2 shows the measured density of the coatings produced at 1 inch standoff onto ⅜ inch square steel tabs from torch to substrate at the original flows and torch current for both Powder C (unbroken line) and Powder D (broken line). Powder C obtained at least 1 to 2 percentage points higher density for the same powder feed rate conditions. It further does not drop off as fast with increasing feed rate as Powder D. This behavior is believed to be due to better melting and possibly staying molten longer by Powder C due to its finer size and higher purity, respectively.

It was found that going to longer standoff than 1 inch, Powder C retained better deposition efficiency than Powder D, possibly supporting the longer time being molten. The long standoff density also remains higher than with Powder D.

EXAMPLE 3

Different torch gas flow and power conditions were evaluated. In a designed experiment, total gas flows of 176 to 264 cubic feet per hour and torch currents of 160 to 190 amperes (the KW of energy varied from 11.7 to 14.8) were tested. It was found that reducing the total gas flows to 176 cubic feet per hour at 14.3 KW gave the highest deposition efficiency, and this was 10 efficiency points higher than shown on FIG. 1 for Powder C. It is believed that these conditions obtain higher melting fractions of the powder by slowing the particles down somewhat as they transit the arc zone and by increasing the available enthalpy for melting. It may not be quite that simple since the highest KW or enthalpy condition did not giver the highest deposition efficiency. Multiple correlation analysis of the deposition efficiency results show an expected increase with torch current and a decrease with increasing total gas flow, but also a possible interaction between the two variables.

The variables of deposition rate, standoff from torch to substrate and substrate surface speed past the torch were evaluated to find the effect on obtaining vertical crack segmentation in the coating. These variables have been rationalized in a composite term called monolayer height. The monolayer height is the instantaneous thickness of coating put down as the substrate moves under the spray cone of the torch. This combines the volume of material delivered to the substrate (deposition rate) and the area over which the material is deposited as defined by the standoff and the surface speed. It will also depend on the spray cone angle of the effluent, which depends upon the torch model and the total gas flows employed. The units of monolayer height are thickness, such a mils or microns.

Figure 3:
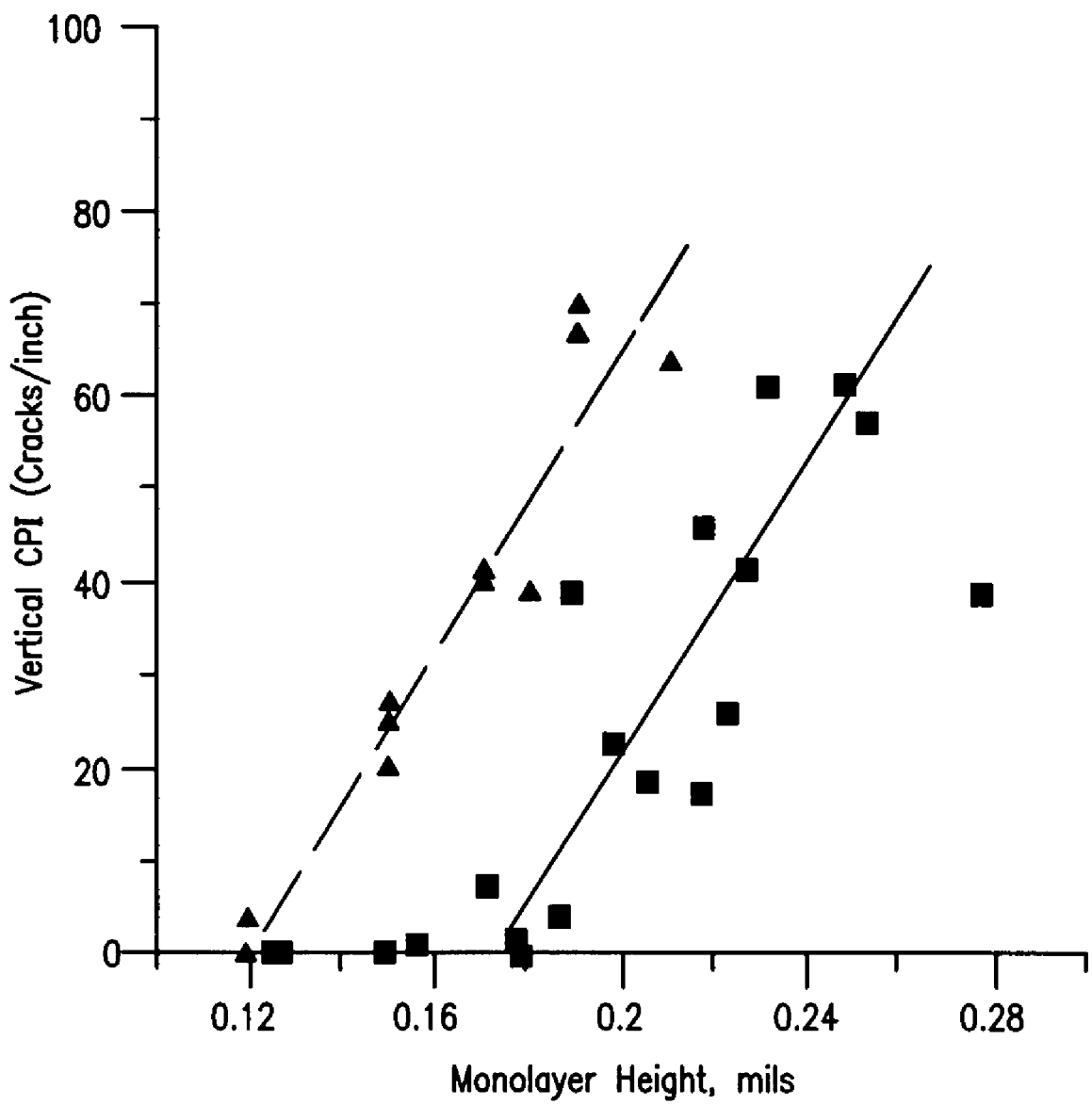
FIG. 3 graphically depicts the dependence of vertical segmentation crack density (cracks per linear inch (CPI) of polished coating cross section length) on monolayer height for a coating produced from a new high purity yttria stabilized zirconia powder (i.e., Powder C or ZrO-300) on 1.0 inch diameter button substrates (unbroken line) and for a coating produced from a conventional yttria stabilized zirconia powder (i.e., Powder D or ZrO-137) on 1.0 inch diameter button substrates (broken line).

It is believed that the residual stress in the coating is tensile in the plane of the coating and this stress increases with monolayer height. FIG. 3 shows the dependence of vertical segmentation crack density (cracks per linear inch (CPI) of polished coating cross section length) on monolayer height. For Powder D coatings produced on 1 inch diameter button substrates (broken line in FIG. 3), a linear dependence of cracking on monolayer height was found, but only after going beyond a threshold monolayer height of about 0.12 mil. Beyond that point of instantaneous deposition thickness, the cracking density increased in proportion to monolayer height.

However, for the Powder C coating produced on 1 inch diameter button substrates (unbroken line in FIG. 3), a totally different threshold monolayer height was required to commence cracking, now about 0.22 mils. Then the linear dependence upon monolayer height has about the same slope as before. This much higher monolayer height threshold may be related to Powder C. It is believed that the much higher purity could lead to higher inherent fracture strength of the coating. This could be due to the higher density obtained for the Powder C coatings, but there may be higher fracture strength even at same densities, compared to the Powder D coatings.

The higher density of the Powder C coating is expected to have increased particle erosion resistance. When thermal barrier coatings of this material are used in applications such as in aircraft gas turbine engines, where runway and airborne dust are common, it is important to have high erosion resistance.

EXAMPLE 4

Figure 4:
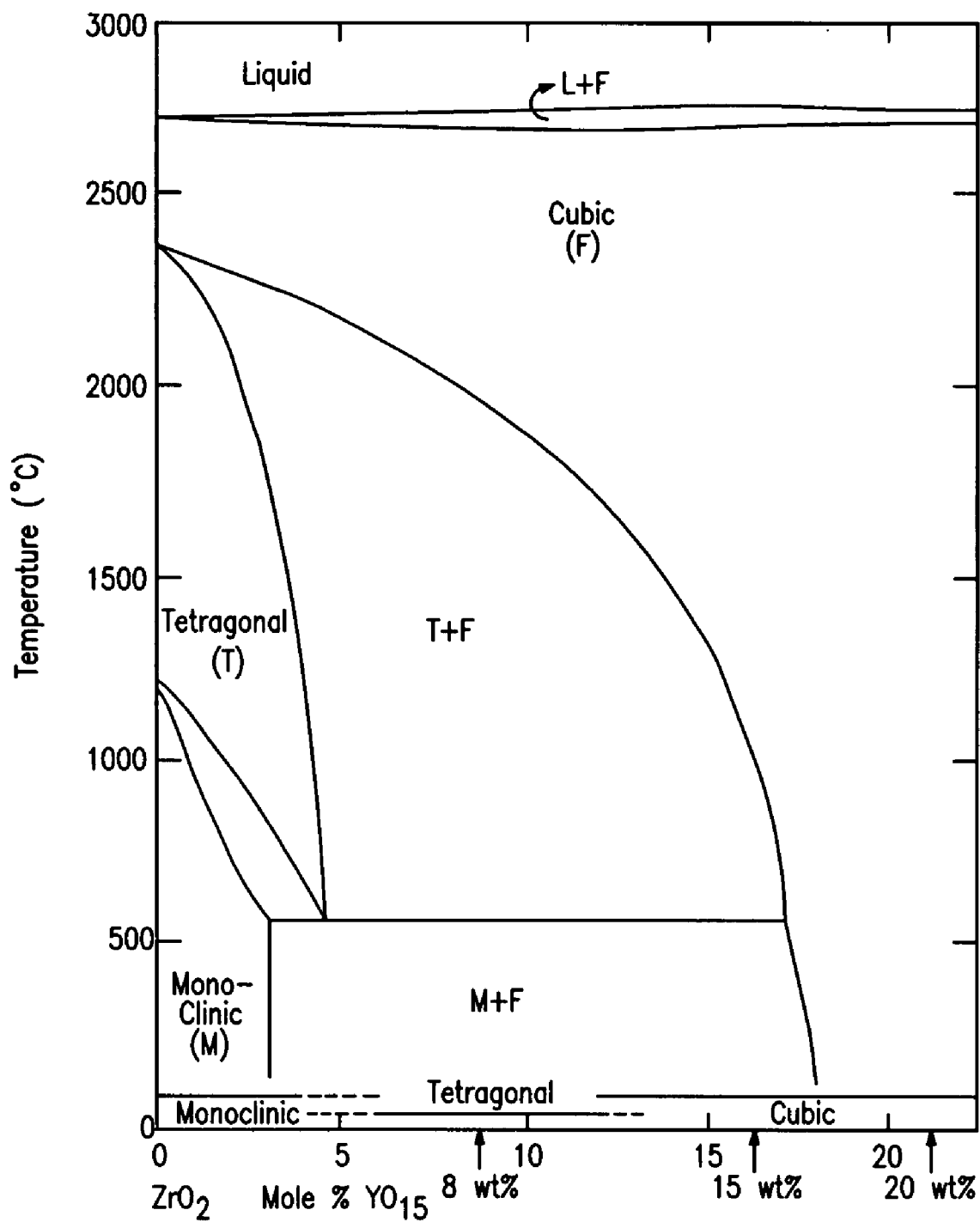
FIG. 4 depicts a phase diagram of zirconia-rich region of a $ZrO_2$—$Y_2O_3$ system. See Bratton and Lau, *Science & Technology of Zirconia*, Amer. Ceram. Soc., 1981, p. 226-240.

The effect of heat treating various coatings was evaluated. One effect considered was the transformation of the tetragonal to monoclinic crystal structure of a coating. For a 7 weight percent yttria stabilized zirconia (YSZ) coating, the equilibrium structure would be monoclinic plus cubic as illustrated in the equilibrium phase diagram in FIG. 4. However, the non-equilibrium tetragonal is obtained in plasma spraying by the rapid solidification of fully alloyed and molten yttria stabilized zirconia splats. To allow a transformation back to equilibrium, one must partition by high temperature chemical diffusion into a low yttria and a high yttria equilibrium phases as illustrated in FIG. 4. See Bratton and Lau, *Science & Technology of Zirconia*, Amer. Ceram. Soc., 1981, p. 226-240. The low yttria phase can then transform from high temperature tetragonal to low temperature monoclinic at about 1000-1200° C. This transformation is actually undesirable since the tetragonal to monoclinic phase change can produce about 4 volume percent expansion as the ceramic is cooled and this creates large internal stress leading to the formation of cracks.

Diffusion is very slow in such high melting temperature ceramics as zirconia, so the non-equilibrium tetragonal is retained in spite of the equilibrium phase diagram. As engines push to higher and higher operating temperature, it appears conventional YSZ coatings can start to transform to partially monoclinic phase.

This heat treating effect was examined with a matrix of temperature and time exposures in air as set forth in Table E. The samples were free-standing coupons of both high purity yttria stabilized zirconia powder (i.e., ZrO-300) coating and conventional yttria stabilized zirconia powder (i.e., ZrO-137) coating. Table D shows representative powder compositions used in the coatings. Three to four coupons of each coating were heat treated in the same load, also allowing for density measurement of sintering effects, as detailed in Example 5 below. The flat coupons were about 0.38 inches square by 25 mils thick. The coatings were deposited on the coupons in a manner similar to that described in Example 3 above.

TABLE D

| Powder Compositions (Weight percent) | | |
|---|---|---|
| | ZrO-137 | ZrO-300 |
| Zirconia | Balance | Balance |
| Yttria | 7.39 | 7.58 |
| Hafnia | 1.5 | 1.6 |
| Alumina | 0.2 | 0.001 |
| Silica | 0.1 | 0.008 |
| Iron oxide | 0.1 | 0.003 |
| Titania | 0.2 | 0.005 |
| Magnesia | 0.2 | 0.002 |
| Calcia | 0.1 | 0.003 |
| All other oxides | 0.3 | 0.1 |

Figure 5:
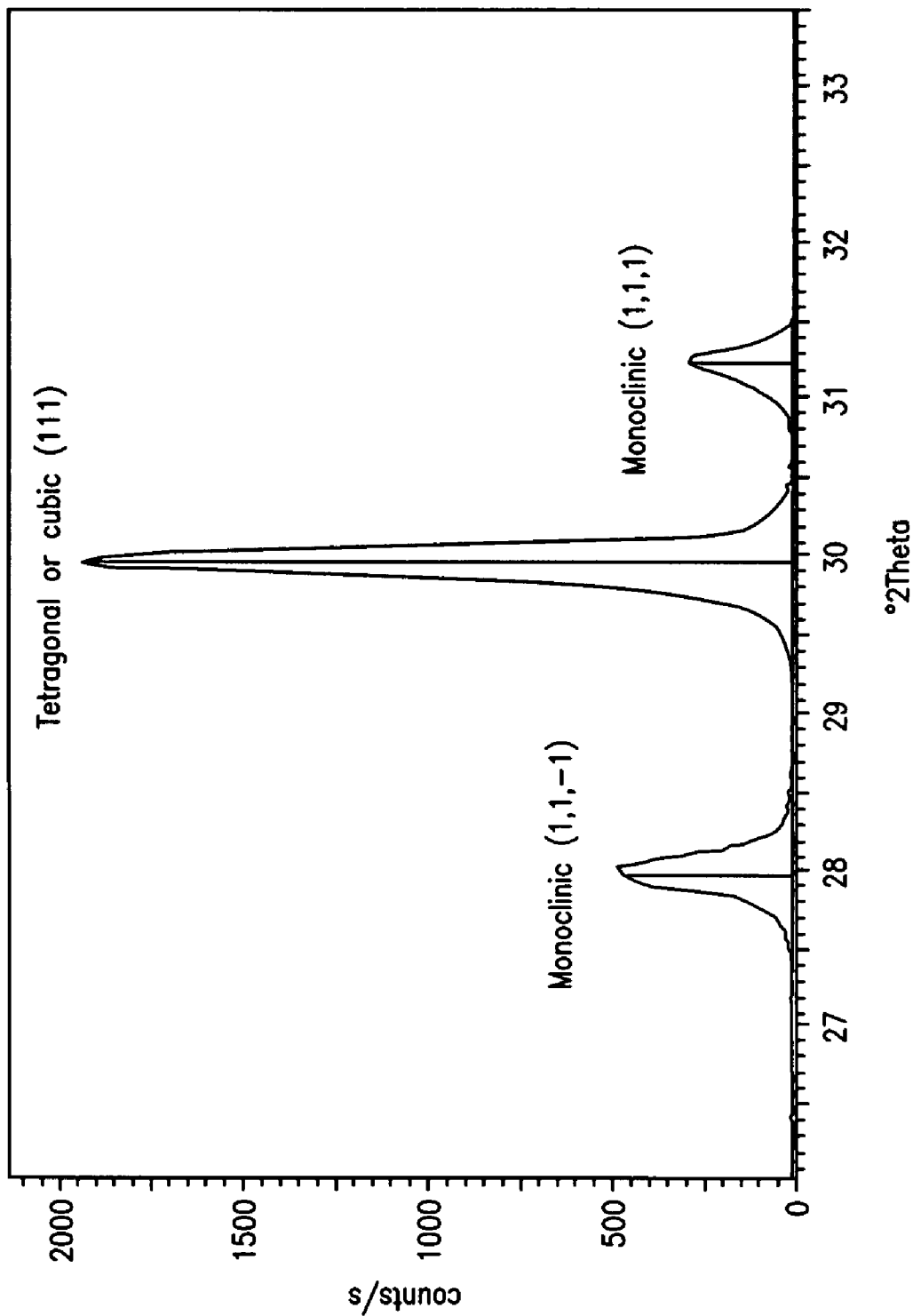
FIG. 5 depicts an X-ray diffraction scan using copper K-alpha radiation, of a conventional ZrO-137 powder coating after 100 hours exposure at 1400° C. in air. The initially pure tetragonal structure has transformed to contain 19.4 percent monoclinic structure.
Figure 6:
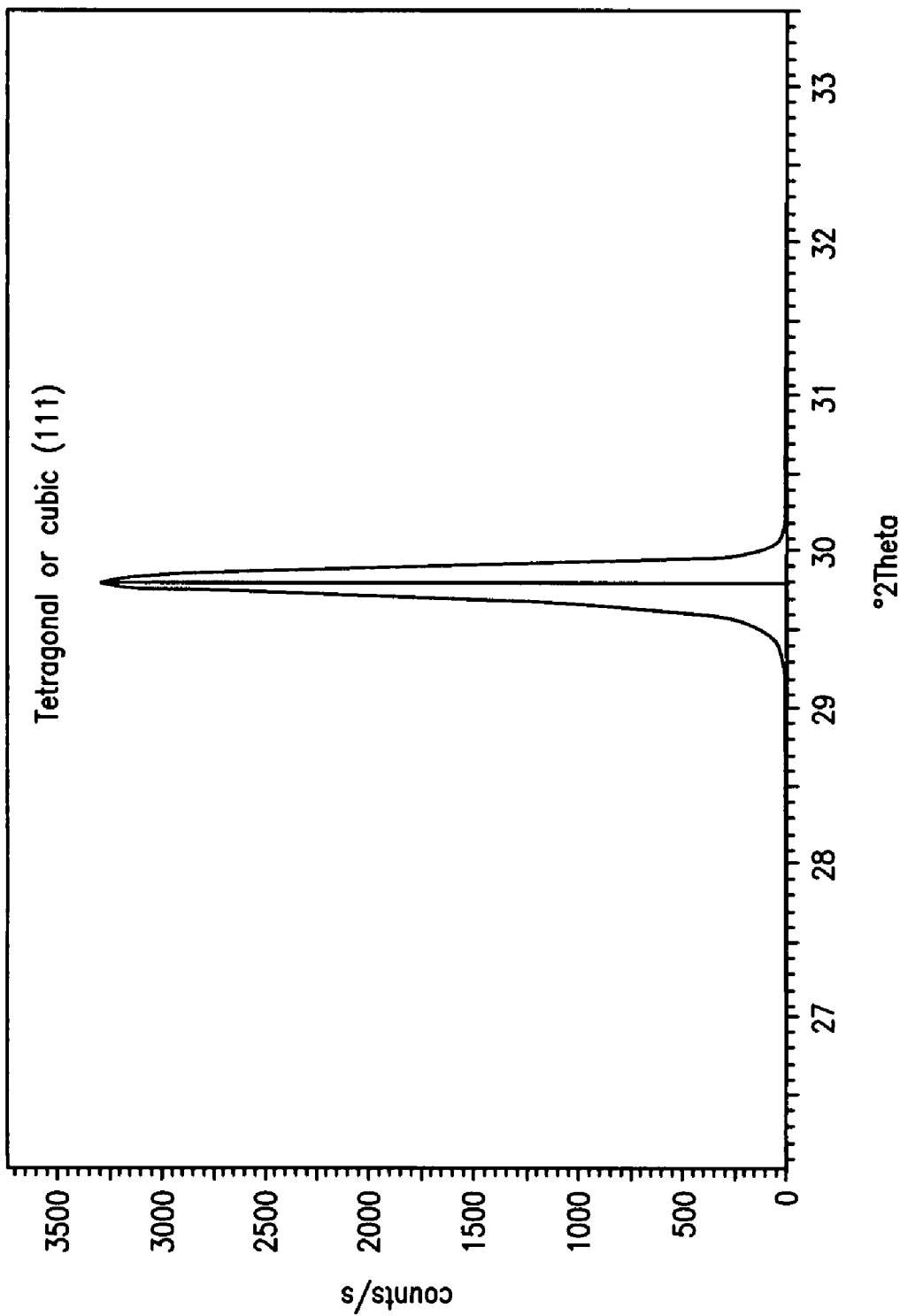
FIG. 6 depicts an X-ray diffraction scan using copper K-alpha radiation, of a new high purity ZrO-300 powder coating after 100 hours exposure at 1400° C. in air. The initially pure tetragonal structure has remained untransformed after 100 hours exposure at 1400° C.

The monoclinic phase was found in x-ray diffraction, with peaks at 28 and 31.3 degrees "2-Theta" for copper radiation, while the tetragonal peak was at about 30 degrees. FIG. 5 depicts an X-ray diffraction scan using copper K-alpha radiation, of conventional ZrO-137 powder coating after 100 hours exposure at 1400° C. in air. The initially pure tetragonal structure has transformed to contain 19.4 percent monoclinic structure. FIG. 6 depicts an X-ray diffraction scan using copper K-alpha radiation, of new high purity ZrO-300 powder coating after 100 hours exposure at 1400° C. in air. The initially pure tetragonal structure has remained untransformed after 100 hours exposure at 1400° C.

The ratio of the 28 degree peak height to the sum of the 28 plus 30 degree peak heights was used to estimate the fraction of monoclinic phase. This "first M peak method" was developed by calibration to known mixtures of pure monoclinic zirconia and tetragonal powders. Table E shows the exposure results for the conventional coating using ZrO-137 powder and the new high purity ZrO-300 powder coatings. The conventional ZrO-137 powder coating starts to transform to monoclinic as low as 1200° C. At 1400° C. the transformation is much more rapid and with an accelerating rate with time. Over the same times and temperatures, the new high purity ZrO-300 powder coating does not transform at all. It would thus appear that impurities in the ceramic act as nucleating sites for the transformation, or that they enhance diffusion rates of yttria to help reach equilibrium.

TABLE E

| Percent Monoclinic Phase in Coatings (First M Peak Method) | | |
|---|---|---|
| Exposure | Coating from ZrO-137 Powder | Coating from ZrO-300 Powder |
| As coated | 0 | 0 |
| 100 hours @ 1200° C. | 0.72 | 0 |
| 100 hours @ 1300° C. | 1.01 | 0 |
| 24 hours @ 1400° C. | 1.04 | 0 |
| 75 hours @ 1400° C. | 11.34 | 0 |
| 100 hours @ 1400° C. | 19.42 | 0 |

EXAMPLE 5

The sintering of new high purity ZrO-300 powder coatings from Example 4 at 1200° C. was examined. The results showed increase in density of less than 0.4 percent after 24 hours at the 1200° C. temperature.

Another coating set was made from a high purity yttria stabilized zirconia powder (i.e., ZrO-300) and exposed in air up to 100 hours at 1200 to 1400° C. The coatings were deposited on the coupons in a manner similar to that described in Example 3 above. To allow comparison to this coating, a set of coating samples was made from conventional yttria stabilized zirconia powder (i.e., ZrO-137). Table F shows representative powder compositions used in the coatings.

TABLE F

| Powder Compositions (Weight percent) | | |
|---|---|---|
| | ZrO-137 | ZrO-300 |
| Zirconia | Balance | Balance |
| Yttria | 7.39 | 7.58 |
| Hafnia | 1.5 | 1.6 |
| Alumina | 0.2 | 0.001 |
| Silica | 0.1 | 0.008 |
| Iron oxide | 0.1 | 0.003 |
| Titania | 0.2 | 0.005 |
| Magnesia | 0.2 | 0.002 |
| Calcia | 0.1 | 0.003 |
| All other oxides | 0.3 | 0.1 |

The coupons were measured by the immersion density method of ASTM B-328, and the results are expressed as a percent of theoretical density (i.e., fully dense, no porosity) in Table G. All coatings were made on the same 11-inch ID coating fixture and carefully removed to give free-standing coupons.

TABLE G

Coating Density After Air Sintering
(Density as a Percent of Theoretical Density)

| Exposure | Coating from ZrO-137 Powder | Coating from ZrO-300 Powder |
| --- | --- | --- |
| As coated | 91.49 | 92.69 |
| 24 hours @ 1200° C. | 91.68 | 93.12 |
| 100 hours @ 1200° C. | 91.70 | 93.07 |
| 1 hour @ 1300° C. | 92.02 | 93.23 |
| 24 hours @ 1300° C. | 89.50 | 93.28 |
| 100 hours @ 1300° C. | 85.73 | 93.51 |
| 1 hour @ 1400° C. | 89.52 | 93.03 |
| 24 hours @ 1400° C. | 82.12 | 93.43 |
| 100 hours @ 1400° C. | 80.33 | 93.34 |

From past observations, sintering of a conventional ZrO-137 powder coating was limited to about 1200° C., and not much density change was noted. Now at higher temperatures, the conventional ZrO-137 powder coating is actually decreasing in density with time at 1300 and 1400° C. Recalling that monoclinic phase was found in the sintered ZrO-137 powder coatings only, and that monoclinic has a lower crystal density, an estimate of the reduced density due to this factor was made. It was found to be not an important effect. Taking the worst case, 100 hours at 1400° C., where monoclinic was found to be 19.42 percent, the 80.33 percent value in Table G would change only to 80.97 percent by this monoclinic compensation.

The 1400° C. sinter samples were mounted and polished to see what was happening. In the conventional ZrO-137 powder coating, it was found that the density decrease was real, with the fine pores in the as-coated structure coarsening with time at 1400° C., and becoming more rounded. Very importantly, after 100 hours the vertical segmentation cracks were gone.

Figure 7:
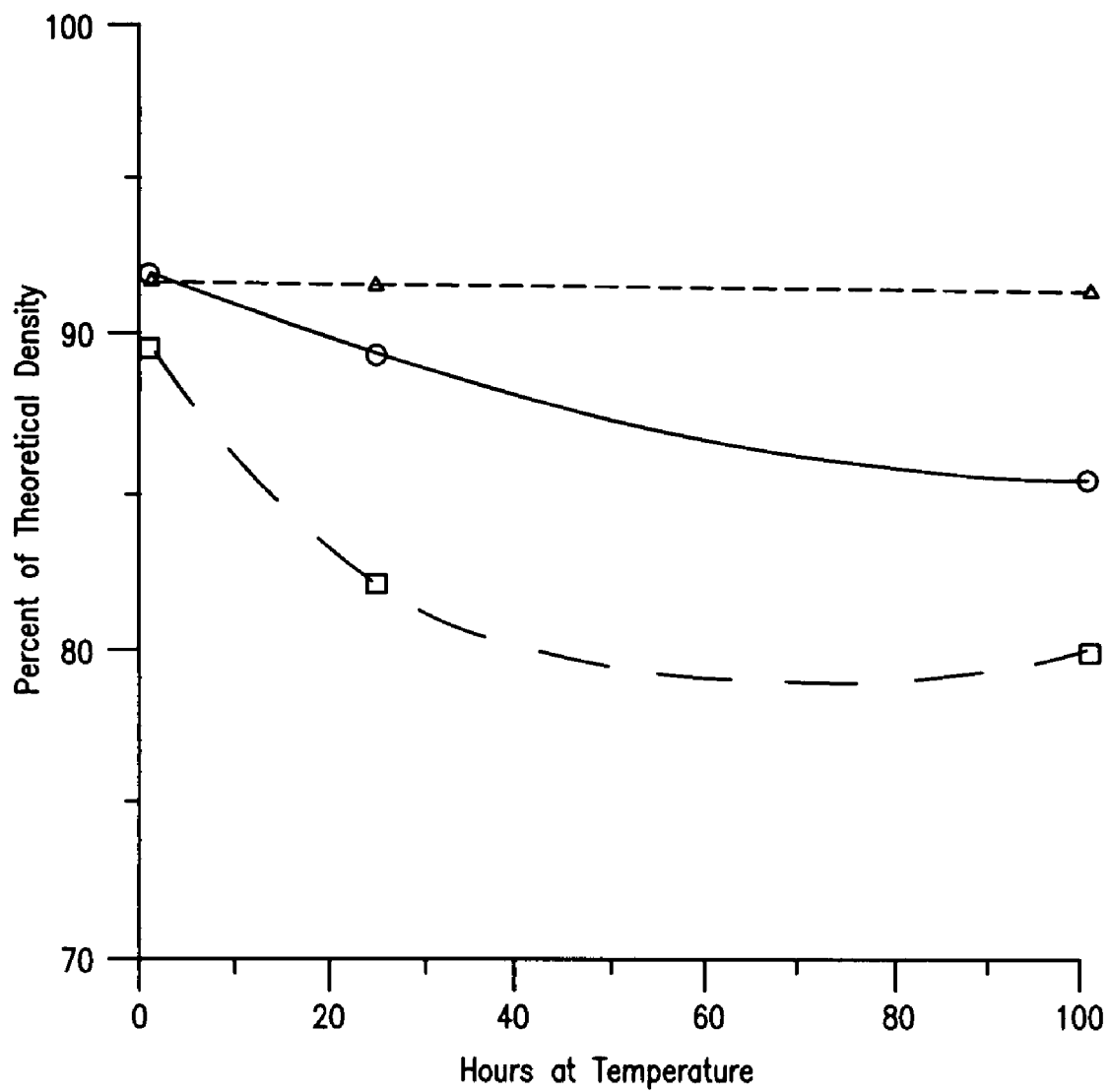
FIG. 7 graphically depicts the dependency of coating density of conventional ZrO-137 powder coating as a function of time at 1200° C. to 1400° C. in air. The as-coated density (broken line in smaller segments) was 91.5% theoretical density. The percent of theoretical density was found to decrease at 1300° C. (unbroken line) to 1400° C. (broken line in larger segments).
Figure 8:
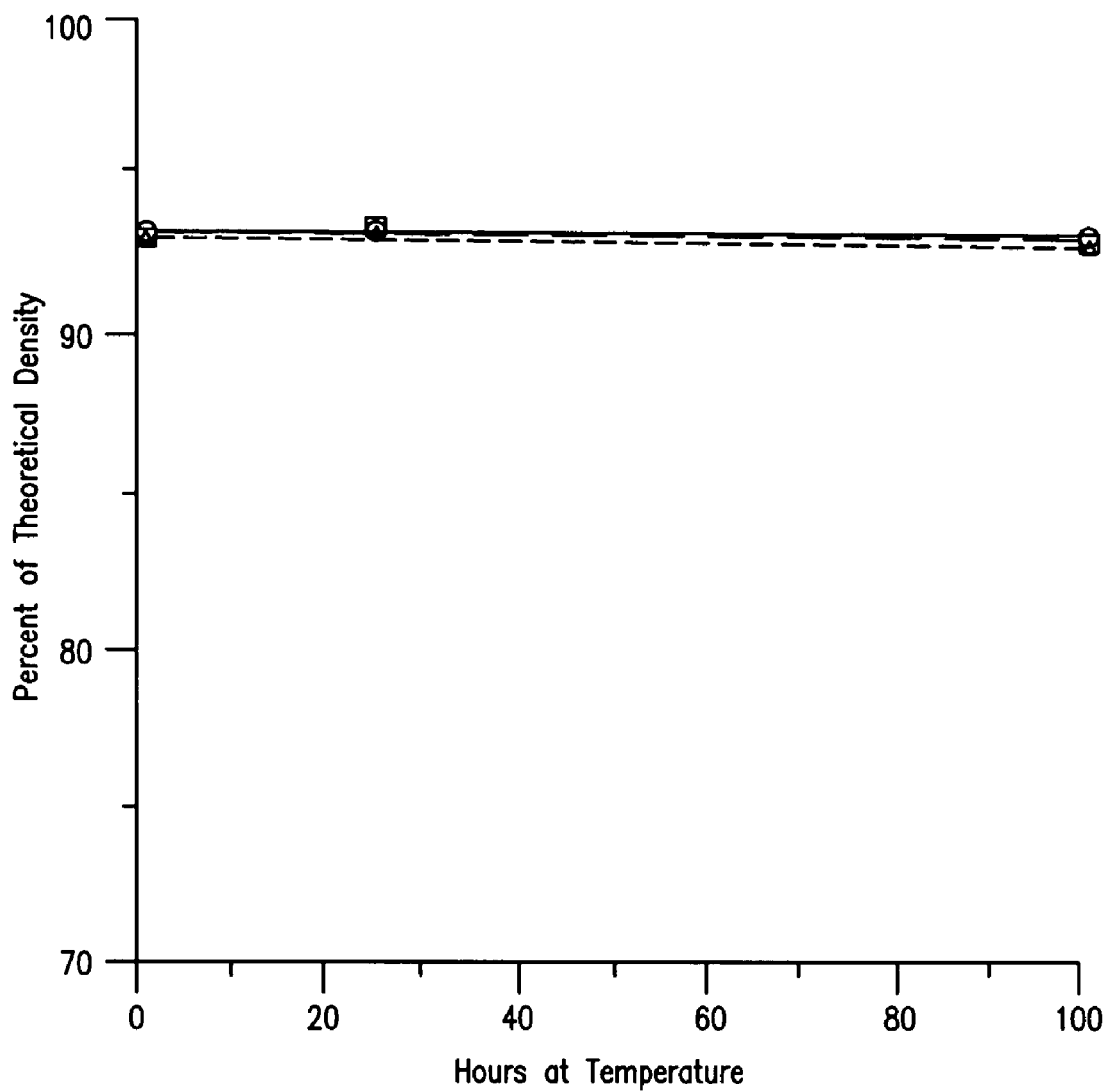
FIG. 8 graphically depicts the dependence of coating density of new high purity ZrO-300 powder coating as a function of time at 1200° C. to 1400° C. in air. The as-coated density (broken line) was 92.7% theoretical density. The percent of theoretical density was found to remain unchanged up to at least 100 hours at 1400° C. (unbroken line).

The new high purity ZrO-300 powder coating is essentially unaffected in density by these sintering exposures. These density data are graphically shown in FIGS. 7 and 8 comparing the conventional ZrO-137 powder coating and new high purity ZrO-300 powder coating behavior. FIG. 7 graphically depicts the dependence of coating density of conventional ZrO-137 powder coating as a function of time at 1200 to 1400° C. in air. The as-coated density (broken line smaller segments) was 91.5% theoretical density. The percent of theoretical density was found to decrease at 1300° C. (unbroken line) to 1400° C. (broken line larger segments). FIG. 8 graphically depicts the dependence of coating density of new high purity ZrO-300 powder coating as a function of time at 1200 to 1400° C. in air. The as-coated density (broken line) was 92.7% theoretical density. The percent of theoretical density was found to remain unchanged up to at least 100 hours at 1400° C. (unbroken line). The 1400° C. sinter samples were mounted and polished for ZrO-300 powder coating as well. With these samples, the fine porosity only slightly decreased with time. Most importantly, the vertical segmentation cracks remained up to 100 hours, essentially unchanged.

EXAMPLE 6

U.S. Pat. No. 5,073,433 discloses thermally sprayed coatings in which vertical segmentation cracks can be controllably introduced into the coating. These can be readily seen if the coating is polished in cross section. The segmentation cracks run generally vertically through the full thickness of the coating, although some are less than full thickness. As described in U.S. Pat. No. 5,073,433, only those vertical cracks that are greater in length than half the thickness of the coating were counted. When the density of those segmentation cracks was controlled to be greater than 20 cracks per linear inch (CPI) along a line parallel to the surface of the substrate, it was found that the YSZ coating had outstanding thermal shock resistance. The same vertical segmentation cracks can be controllably introduced into the coatings using the high purity ZrO-300 powder.

There is another feature in the polished microstructure of interest, namely the horizontal cracks. These are parallel to the plane of the coating and to the layers of the coating as it is built up by thermal spray passes. These horizontal cracks are typically short, and may be isolated within the coating, or act like branches connected to the vertical segmentation cracks. It is thought that such horizontal cracks may be the initiation cracks for long separation cracks that might grow in thermal cycling, leading to spallation of the YSZ coating layer in the worst case.

A coating set was made from a high purity yttria stabilized zirconia powder (i.e., ZrO-300) and from conventional yttria stabilized zirconia powder (i.e., ZrO-137). The coatings were deposited in a manner similar to that described in Example 4 above. Table H shows representative powder compositions used in the coatings.

TABLE H

Powder Compositions
(Weight percent)

| | ZrO-137 | ZrO-300 |
| --- | --- | --- |
| Zirconia | Balance | Balance |
| Yttria | 7.39 | 7.58 |
| Hafnia | 1.5 | 1.6 |
| Alumina | 0.2 | 0.001 |
| Silica | 0.1 | 0.008 |
| Iron oxide | 0.1 | 0.003 |
| Titania | 0.2 | 0.005 |
| Magnesia | 0.2 | 0.002 |
| Calcia | 0.1 | 0.003 |
| All other oxides | 0.3 | 0.1 |

Figure 9:
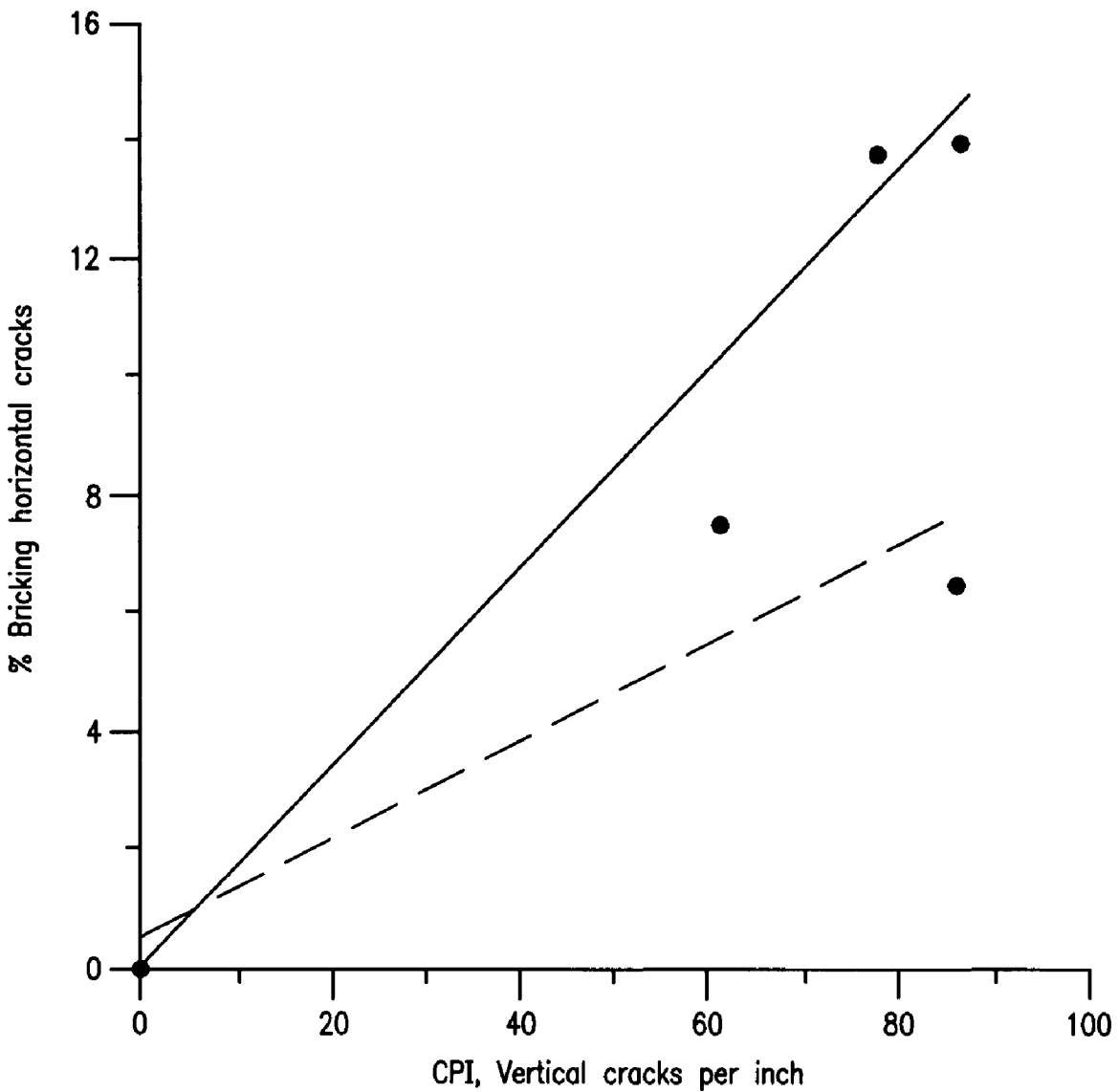
FIG. 9 graphically depicts a comparison between the new high purity ZrO-300 powder coating (broken line) and the conventional ZrO-137 powder coating (unbroken line) for correlations between percent bricking (horizontal cracks) and vertical segmentation crack density (CPI).

The extent of the horizontal cracks was measured in the coatings. The length of any horizontal crack that touches two countable vertical segmentation cracks was measured. For purposes herein, these horizontal cracks can be called "bricking". The sum of all such qualifying "bricking" horizontal crack lengths, divided by the total width of the coating evaluated is thus "% Bricking", being a percent of the coating width. For coatings made from the new high purity ZrO-300 powder, % Bricking=0.086 ×CPI+0.54. For coatings made from the conventional ZrO-137 powder, % Bricking=0.17× CPI+0.067. It was found that as the density of vertical segmentation cracks was increased (higher CPI) the % bricking (% Bk) also increased. FIG. 9 shows a plot of the vertical and horizontal bricking crack measurements on a number of coatings which were controllably induced to have different vertical CPI. The relation between horizontal and vertical cracks appears linear, and can be least-squares fit to provide a relating equation.

In working with the new high purity ZrO-300 powder to make vertically segmented YSZ coatings, a surprising result for the horizontal bricking cracks was found. The new high purity ZrO-300 powder coating (broken line in FIG. 9) has about half the number of bricking cracks for the same vertical CPI as the conventional ZrO-137 powder coating (unbroken line in FIG. 9). It is believed that the new high purity ZrO-300 powder coating has higher internal cohesive strength.

EXAMPLE 7

The vertically crack-segmented coatings of U.S. Pat. No. 5,073,433 have found utility as thermal barrier coatings in a wide variety of applications, ranging from gas turbine engine components to steel mill rolls. In most cases, the YSZ thermal barrier coating is on the outside of a metallic substrate, facing the high temperature environment, and reducing the substrate temperature by its insulative nature. So there is a thermal gradient through the thermal barrier coating, high temperature on the exposed YSZ coating surface and lower temperature on the substrate side of the coating. In addition, the thermal exposure may be cyclic, where the whole component is alternately exposed to high heating and then cooling, such as when a gas turbine engine is started or stopped.

A laboratory test has been developed to simulate both the thermal gradient and the cyclic nature of such applications. For purposes herein, it is called the JETS test, for "Jet Engine Thermal Simulation". The test is useful for developmental coatings to determine if they are capable of the anticipated use. The laboratory test uses a sample that is a 1-inch diameter flat button, about ⅛-inch thick, typically of some superalloy. This substrate is thermally sprayed with a metallic bondcoat (e.g., CoNiCrAlY bondcoat), and then the YSZ thermal barrier layer is applied. Different YSZ layer thicknesses can be tested, along with different segmentation CPI structures. The coated buttons face an oxygen-propylene burner nozzle, which heats the YSZ face to 1400° C. (2550° F.) in 20 seconds, for a standard reference sample on each load.

Fifteen additional experimental buttons are held in the same wheel fixture, which then rotates to an air-blast cooling position after the heating period for another 20 seconds. Then there are two more rotations into ambient air cooling positions, before starting the heating-cooling cycle again. Typically, each sample is given 2000 such cycles, and then the polished circumference edge of the button is inspected to see if there is any sign of separation cracking. This is measured at 30× magnification, and any separation crack segments are measured and summed, then expressed as a percent of the button circumference. Somewhat arbitrarily, a 15 percent edge cracking has been chosen as "failure" in the JETS test. A coating that passes the JETS test has a high probability of doing well in actual service applications.

A coating set was made from a high purity yttria stabilized zirconia powder (i.e., ZrO-300) and a control from a conventional yttria stabilized zirconia powder (i.e., ZrO-137). The coatings were deposited on the buttons in a manner similar to that described in Example 4 above. The new high purity ZrO-300 powder coatings were 25 mils (+/−2 mils) thick on a metallic bondcoat. The metallic bondcoat was CoNiCrAlY having a thickness of about 8 mils. The monolayer height varied for segmentation effects. The conventional ZrO-137 powder coating used as a control was 45 mils thick. Table I shows representative powder compositions used in the coatings.

TABLE I

Powder Compositions (Weight percent)

|  | ZrO-137 | ZrO-300 |
|---|---|---|
| Zirconia | Balance | Balance |
| Yttria | 7.39 | 7.58 |
| Hafnia | 1.5 | 1.6 |
| Alumina | 0.2 | 0.001 |
| Silica | 0.1 | 0.008 |
| Iron oxide | 0.1 | 0.003 |
| Titania | 0.2 | 0.005 |
| Magnesia | 0.2 | 0.002 |
| Calcia | 0.1 | 0.003 |
| All other oxides | 0.3 | 0.1 |

Figure 10:
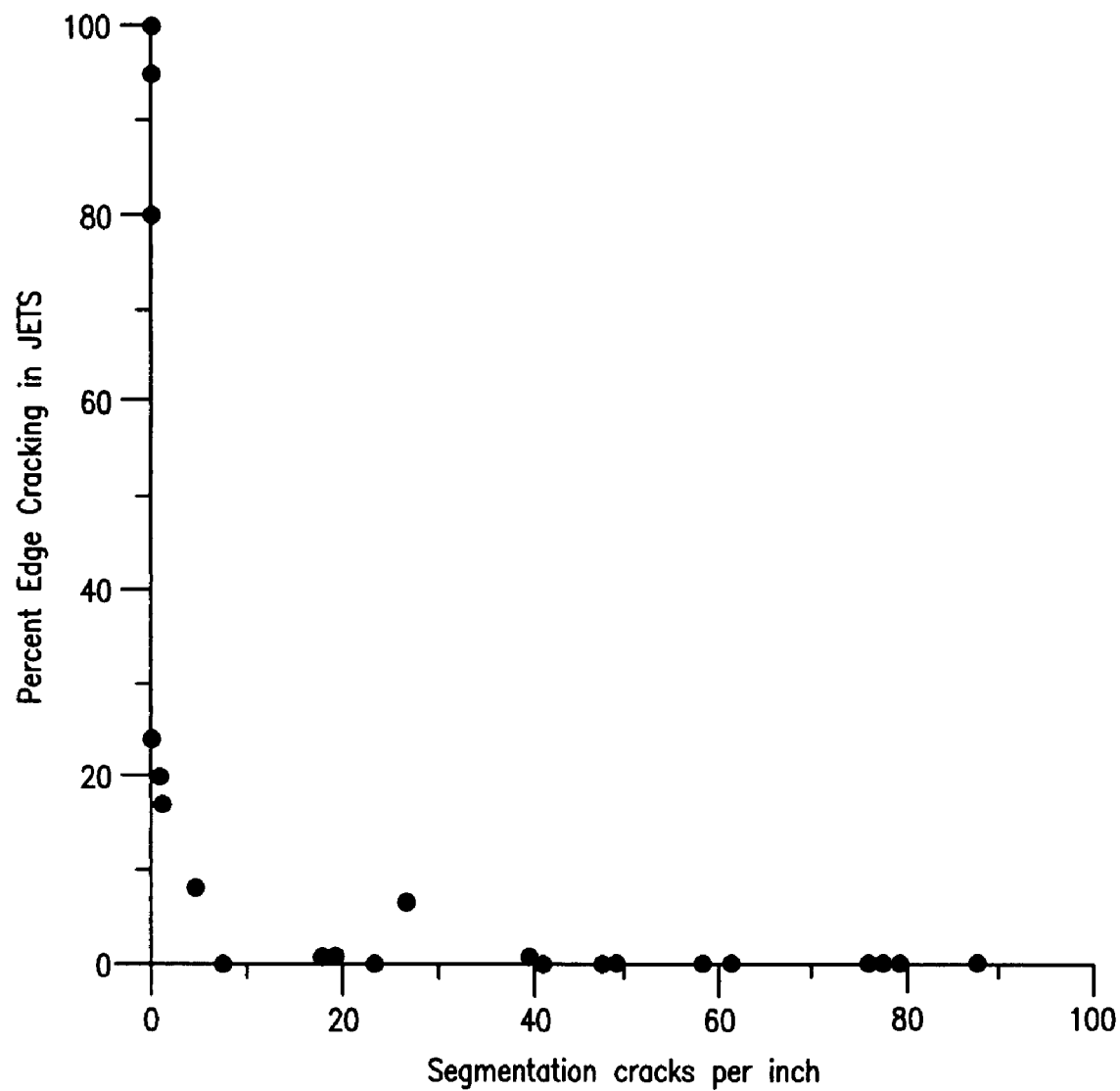
FIG. 10 graphically depicts the dependence of percent of edge cracking after a 2000 cycle JETS test on vertical segmentation crack density (measured in CPI) using the new high purity ZrO-300 powder coating in the as coated condition. Cracking over 15 percent is considered a failed coating, which for about 10 CPI or greater is avoided.

Using the JETS test with the new high purity ZrO-300 powder coatings and conventional ZrO-137 powder coating as a control, it was found the new high purity ZrO-300 powder coatings performed better than the conventional ZrO-137 powder coatings. FIG. 10 shows the dependence of edge cracking after 2000 test cycles on the vertical crack segmentation density (measured in CPI) in the coatings. Coatings with no segmentation cracks readily failed. However, for greater than about 10 CPI in the high purity ZrO-300 powder coatings, they all readily passed the JETS test. With the conventional ZrO-137 powder coatings, this threshold is about 20 CPI.

Figure 11:
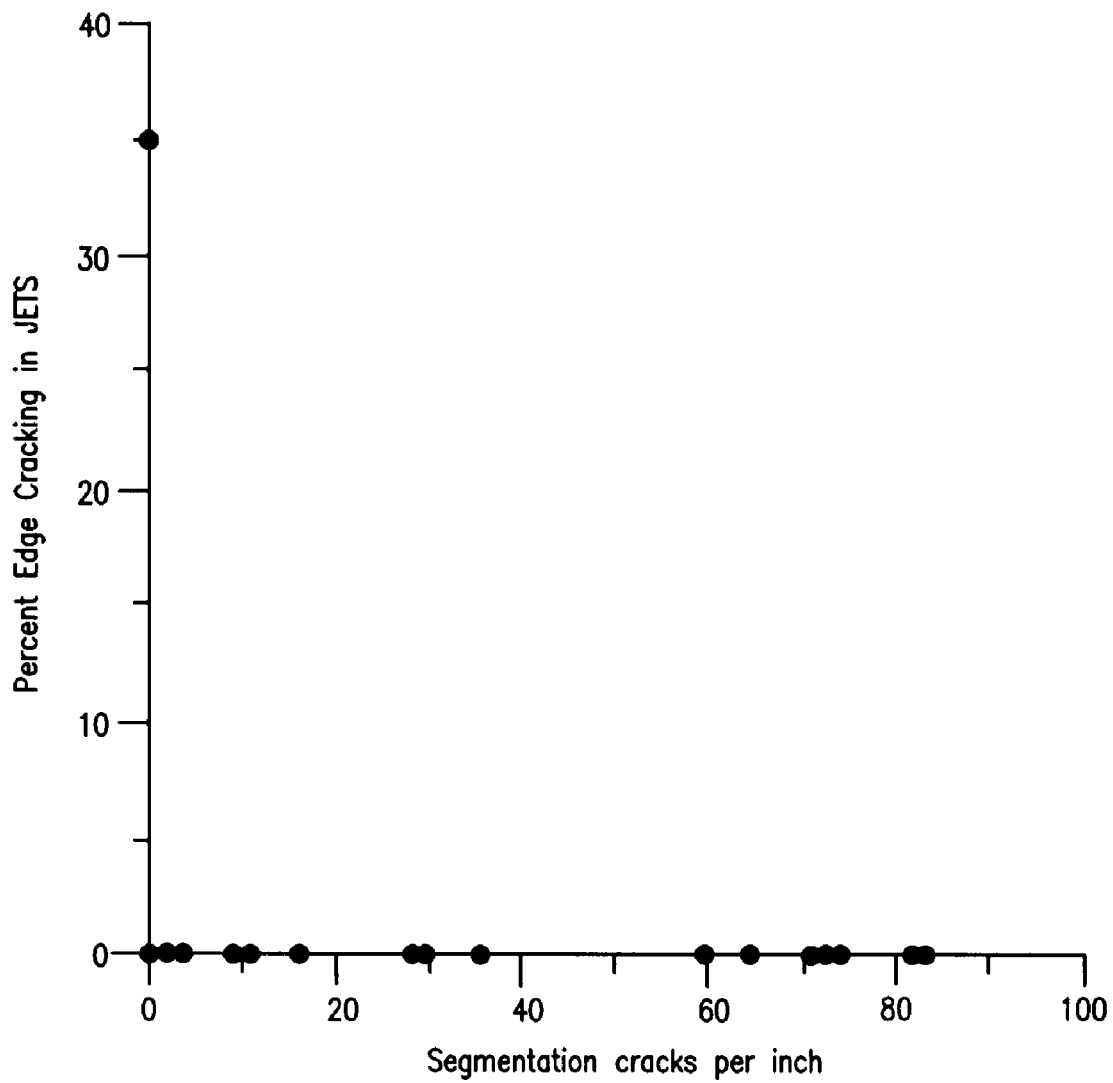
FIG. 11 graphically depicts the dependence of percent of edge cracking after a 2000 cycle JETS test on vertical segmentation crack density (CPI) using the new high purity ZrO-300 powder coating in the heat treated (4 hours/1975° F./vacuum) condition. Cracking over 15 percent is considered a failed coating, which for about 5 CPI or greater is avoided.

Another important discovery was made when the ZrO-300 powder coatings were heated prior to JETS testing. The heat treatment involved heating in vacuum at 25° C. per minute to 1080° C. (1975° F.), holding for 4 hours, and then cooling in vacuum at 25° C. per minute. FIG. 11 shows the JETS test results for these heat treated samples. The CPI was measured on the heat treated coatings before testing, using a mating button and the polished cross section method discussed above. The heat treated high purity coatings did even better than the as-coated samples. The threshold of CPI for having excellent thermal shock life was even lower than 10 CPI. So another finding is to coat the high purity ZrO-300 powder coatings to a safe CPI structure and then heat treat the coated article. This heat treatment is one of many variations that can achieve this improved result.

While the preferred embodiments of this invention have been described, it will be appreciated that various modifications may be made to the high purity yttria or ytterbia stabilized zirconia powders, coatings made from the high purity yttria or ytterbia stabilized zirconia powders, and processes for producing the coatings for substrates intended to operate in cyclic thermal environments without departing from the spirit or scope of the invention.

The invention claimed is:

1. An article coated with a thermal barrier coating comprising zirconia partially stabilized by yttria, and having a density greater than 88% of the theoretical density, in the tetragonal crystallographic form, with a plurality of vertical macrocracks substantially homogeneously dispersed throughout the coating in which a cross-sectional area of the coating normal to the article exposes a plurality of vertical macrocracks extending at least half the coating thickness in length up to the full thickness of the coating and having from about 5 to about 200 vertical macrocracks per linear inch measured in a line parallel to the surface of the article and in a plane perpendicular to the surface of the article, said thermal barrier coating comprising a thermally sprayed coating of a high purity yttria stabilized zirconia powder, said high purity yttria stabilized zirconia powder comprising from about 0 to about 0.01 weight percent silicon dioxide (silica), from about 0 to about 0.002 weight percent aluminum oxide (alumina), from about 0 to about 0.005 weight percent calcium oxide, from about 0 to about 0.005 weight percent ferric oxide, from about 0 to about 0.002 weight percent magnesium oxide, from about 0 to about 0.005 weight percent titanium dioxide, from about 1.5 to about 2 weight percent hafnium oxide (hafnia), from about 6 to about 25 weight percent yttrium oxide (yttria), from about 0 to 0.1 weight percent other oxides, and the balance zirconium oxide (zirconia); wherein said thermal barrier coating, after exposure at 1200° C. for 100 hours, has no monoclinic phase as determined by x-ray diffraction methods.

2. The article of claim 1 wherein the high purity yttria stabilized zirconia powder has a particle size of from about 1 to about 150 microns.

3. The article of claim 1 wherein the thermally sprayed coating has a density from 90% to 98% of the theoretical density and wherein a plurality of said vertical macrocracks extend at least two-thirds the coating thickness in length up to the full thickness of the coating.

4. The article of claim 1 wherein the thermally sprayed coating has at least about 20 vertical macrocracks per linear inch measured in a line parallel to the surface of the article and in a plane perpendicular to the surface of the article.

5. The article of claim 1 wherein the thermally sprayed coating has at least about 40 vertical macrocracks per linear inch measured in a line parallel to the surface of the article and in a plane perpendicular to the surface of the article.

6. The article of claim 1 wherein, in the thermally sprayed coating, the width of the vertical macrocracks is less than 1 mil.

7. The article of claim 1 wherein, in the thermally sprayed coating, the density is greater than 90% of the theoretical density and the coating has at least about 75 vertical macrocracks per linear inch measured in a line parallel to the surface of the article and in a plane perpendicular to the surface of the article.

8. The article of claim 1 wherein a bond coating is deposited between the article and the thermally sprayed coating, said bond coating comprising (i) an alloy containing chromium, aluminum, yttrium with a metal selected from the group consisting of nickel, cobalt and iron or (ii) an alloy containing aluminum and nickel.

9. The article of claim 1 wherein a bond coating is deposited between the article and the thermally sprayed coating, said bond coating comprising a MCrAlY+X coating applied by a plasma spray method, where M is Ni, Co or Fe or any combination of the three elements, and X includes the addition of Pt, Ta, Hf, Re or other rare earth metals, or fine alumina dispersant particles, singularly or in combination.

10. The article of claim 1 wherein a bond coating is deposited between the article and the thermally sprayed coating, said bond coating comprising a MCrAlY+X coating applied by a detonation spray method, where M is Ni, Co or Fe or any combination of the three elements, and X includes the addition of Pt, Ta, Hf, Re or other rare earth metals, or fine alumina dispersant particles, singularly or in combination.

11. The article of claim 1 wherein a bond coating is deposited between the article and the thermally sprayed coating, said bond coating comprising a MCrAlY+X coating applied by an electroplating method, where M is Ni, Co or Fe or any combination of the three elements, and X includes the addition of Pt, Ta, Hf, Re or other rare earth metals, singularly or in combination.

12. The article of claim 1 wherein the thermally sprayed coating has a density of at least 90% of the theoretical density and the coating has at least about 100 vertical macrocracks per linear inch measured in a line parallel to the surface of the article and in a plane perpendicular to the surface of the article.

13. The article of claim 1 wherein the thermally sprayed coating has a thickness of from about 0.0025 to about 0.10 inches.

14. The article of claim 1 comprising a turbine blade or vane of nickel or cobalt-base alloy, coated first with a metallic bond coat and then with a layer of said thermally sprayed coating, having a thermally sprayed coating thickness of about 5 to about 25 mils, and a vertical crack segmentation pattern of from about 20 to about 100 cracks per linear inch measured in the polished cross section in a direction parallel to the plane of the coating, counting those cracks that are at least half the coating thickness in length.

15. The article of claim 1 comprising a turbine combustion chamber of nickel or cobalt-base alloy, coated first with a metallic bond coat and then with a layer of said thermally sprayed coating, having a thermally sprayed coating thickness of about 5 to about 200 mils, and a vertical crack segmentation pattern of from about 5 to about 200 cracks per linear inch measured in the polished cross section in a direction parallel to the plane of the coating, counting those cracks that are at least half the coating thickness in length.

16. The article of claim 1 comprising a turbine air seal segment or ring of nickel or cobalt-base alloy, coated first with a metallic bond coat and then with a layer of said thermally sprayed coating, having a thermally sprayed coating thickness of about 5 to about 150 mils, and a vertical crack segmentation pattern of from about 20 to about 100 cracks per linear inch measured in the polished cross section in a direction parallel to the plane of the coating, counting those cracks that are at least half the coating thickness in length.

17. The article of claim 1 comprising a turbine or compressor blade of nickel or cobalt-base alloy, coated first with a metallic bond coat and then with a layer of said thermally sprayed coating, having a thermally sprayed coating thickness of about 5 to about 45 mils, and a vertical crack segmentation pattern of from about 20 to about 100 cracks per linear inch measured in the polished cross section in a direction parallel to the plane of the coating, counting those cracks that are at least half the coating thickness in length.

18. The article of claim 1 comprising a cylinder or transport roll for steel or glass annealing lines, coated first with a metallic bond coat and then with a layer of said thermally sprayed coating, having a thermally sprayed coating thickness of about 5 to about 45 mils, and a vertical crack segmentation pattern of from about 20 to about 100 cracks per linear inch measured in the polished cross section in a direction parallel to the plane of the coating, counting those cracks that are at least half the coating thickness in length.

19. The article of claim 1 in which the thermally sprayed coating is stabilized by heat treatment in vacuum or air at a temperature of 1000° C. or greater.

20. An article coated with a thermally sprayed coating of a high purity yttria stabilized zirconia powder, and having a density greater than 90% of the theoretical density, in the tetragonal crystallographic form, with a plurality of vertical macrocracks, said high purity yttria stabilized zirconia powder comprising from about 0 to about 0.01 weight percent silicon dioxide (silica), from about 0 to about 0.002 weight percent aluminum oxide (alumina), from about 0 to about 0.005 weight percent calcium oxide, from about 0 to about 0.005 weight percent ferric oxide, from about 0 to about 0.002 weight percent magnesium oxide, from about 0 to about 0.005 weight percent titanium dioxide, from about 1.5 to about 2 weight percent hafnium oxide (hafnia), from about 6 to about 25 weight percent yttrium oxide (yttria), from about 0 to 0.1 weight percent other oxides, and the balance zirconium oxide (zirconia); wherein said thermally sprayed coating, after exposure at 1200° C. for 100 hours, has no monoclinic phase as determined by x-ray diffraction methods.

21. The article of claim 20 wherein the coating, after exposure in air for 100 hours at 1400° C., has essentially no reduction in vertical segmentation cracks.

22. The article of claim 20 wherein the coating, after exposure in air for 100 hours at 1400° C., has essentially no reduction in density.

23. An article coated with a thermal barrier coating, said thermal barrier coating comprising a thermally sprayed coating of a high purity yttria stabilized zirconia powder, in the tetragonal crystallographic form, and having a plurality of vertical macrocracks, said high purity yttria stabilized zirconia powder comprising from about 0 to about 0.01 weight percent silicon dioxide (silica), from about 0 to about 0.002 weight percent aluminum oxide (alumina), from about 0 to about 0.005 weight percent calcium oxide, from about 0 to about 0.005 weight percent ferric oxide, from about 0 to about 0.002 weight percent magnesium oxide, from about 0 to about 0.005 weight percent titanium dioxide, from about 1.5 to about 2 weight percent hafnium oxide (hafnia), from about 6 to about 25 weight percent yttrium oxide (yttria), from about 0 to 0.1 weight percent other oxides, and the balance zirconium oxide (zirconia); wherein said thermally sprayed coating is deposited at a thickness per layer of at least about 0.16 mils or greater and at a percent of theoretical density of from 90% to 98%; and wherein said thermal barrier coating, after exposure at 1200° C. for 100 hours, has no monoclinic phase as determined by x-ray diffraction methods.

* * * * *